US009788234B2

(12) United States Patent
Baker

(10) Patent No.: US 9,788,234 B2
(45) Date of Patent: Oct. 10, 2017

(54) SHARED COMMUNICATION LINKS IN AN ELECTRONIC TRADING SYSTEM

(71) Applicant: TRADING TECHNOLOGIES INTERNATIONAL INC., Chicago, IL (US)

(72) Inventor: William Tigard Baker, Hoffman Estates, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

(21) Appl. No.: 14/574,238

(22) Filed: Dec. 17, 2014

(65) Prior Publication Data
US 2016/0183120 A1 Jun. 23, 2016

(51) Int. Cl.
H04L 12/58 (2006.01)
H04W 28/02 (2009.01)
G06Q 40/04 (2012.01)

(52) U.S. Cl.
CPC ........ H04W 28/0268 (2013.01); G06Q 40/04 (2013.01)

(58) Field of Classification Search
None
See application file for complete search history.

(56) References Cited

U.S. PATENT DOCUMENTS 7,133,368 B2 11/2006 Zhang et al.
8,180,351 B2* 5/2012 Stanforth ............ H04W 88/16 370/338
2005/0036470 A1 2/2005 Calvert
2014/0180892 A1* 6/2014 Strehl ............... G06Q 40/04 705/37
2015/0334761 A1* 11/2015 Liao ................. H04W 76/025 455/552.1

OTHER PUBLICATIONS

International Search Report and Written Opinion of International Application No. PCT/US2015/064952, dated Jan. 26, 2016 (dated Mar. 1, 2016).

* cited by examiner

Primary Examiner — Zewdu A Beyen
(74) Attorney, Agent, or Firm — McDonnell Boehnen Hulbert & Berghoff LLP

(57) ABSTRACT

Certain embodiments provide methods, tangible computer storage medium, and systems of shared communication links in an electronic trading system. An example method includes determining a first network service state of a first communication network established between a first wireless trading device and an exchange and receiving a second network service state of a second communication network established between a second wireless trading device and the exchange. The first wireless trading device receives the second network state from the second wireless device via a shared communication link. The example method also includes determining an active communication network based on a quality-of-service metric calculated between the first communication network and the second communication network by comparing the first network service state and the second network service state. The example method also includes communicating market information related to one or more markets with the exchange utilizing the active communication network and distributing the market information via the shared communication link.

12 Claims, 13 Drawing Sheets

SHARED COMMUNICATION LINKS IN AN ELECTRONIC TRADING SYSTEM

BACKGROUND

An electronic trading system generally includes a trading device in communication with an electronic exchange. The trading device receives information about a market, such as prices and quantities, from the electronic exchange. The electronic exchange receives messages, such as messages related to orders, from the trading device.

Mobile or wireless trading devices (e.g., a smart phone, a tablet, etc.) generally communicate with the electronic exchange via a wireless communication network. One or more network conditions (e.g., a connectivity level of the mobile trading device to the wireless communication network, server latency at a gateway, etc.) can affect communication between the mobile trading device and the electronic exchange via the wireless communication network.

BRIEF DESCRIPTION OF THE FIGURES

Certain embodiments are disclosed with reference to the following drawings.

Figure 1:
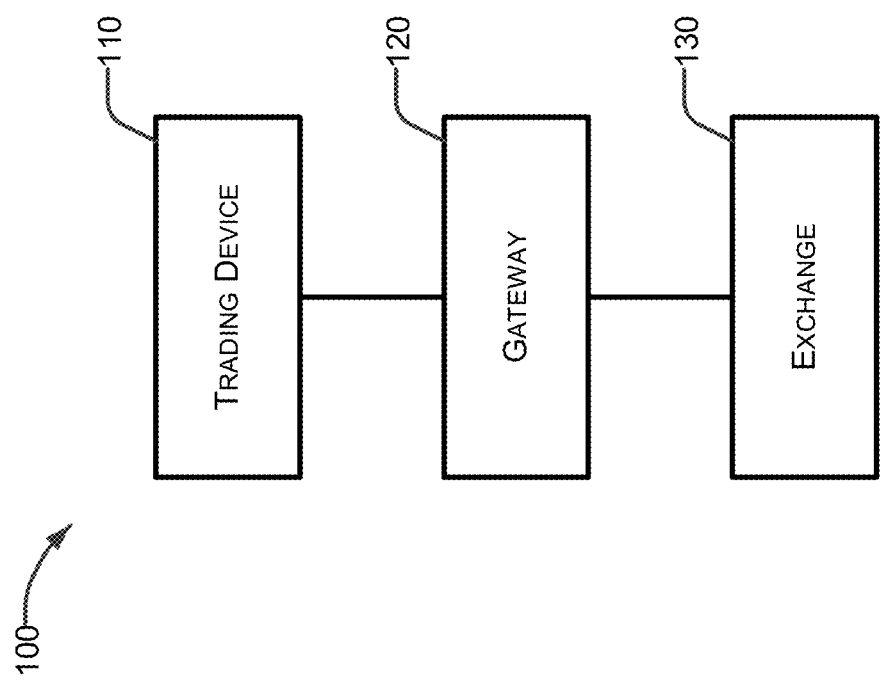
FIG. 1 illustrates a block diagram representative of an example electronic trading system in which certain embodiments may be employed.

Certain embodiments will be better understood when read in conjunction with the provided figures, which illustrate examples. It should be understood, however, that the embodiments are not limited to the arrangements and instrumentality shown in the attached figures.

DETAILED DESCRIPTION

This disclosure relates generally to electronic trading systems and, more specifically, to shared communication links in an electronic trading system.

Trading devices, such as mobile or portable trading devices (e.g., hand-held devices, laptops, tablets, cell phones, portable computing devices, etc.), establish a communication link (e.g., via a wireless communication network) with an exchange via a gateway. A state of one or more conditions (e.g., a connectivity level of the mobile trading device, memory usage at the gateway, etc.) of the communication link may impair communication between the trading device and the gateway. For example, if the connectivity level of the trading device deteriorates, the communication between the trading device and the gateway may be interrupted (e.g., delayed, incomplete, substantially impaired and/or lost).

Embodiments disclosed herein include shared communication links in an electronic trading system. Certain embodiments disclosed herein include determining a service state of a communication network established between a trading device and an exchange. A second network service state is received that corresponds to a second communication network established between a second trading device and the exchange. Market information is communicated with the exchange by utilizing an active communication network that is determined based on a quality-of-service metric calculated between the communication network and the second communication network. The market information is distributed between the trading device and the second trading device via a shared communication link.

Certain embodiments disclosed herein assign a first communication link to communicate a first set of information between a first device and a gateway and assign a second communication link to communicate a second set of information between a second device and the gateway. The sets of information are shared between the corresponding devices via a shared communication link. In some examples, determining which information is assigned to the first communication link and the second communication link is based on a first communication state of the first communication link and a second communication state of the second communication link.

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

I. Brief Description of Certain Embodiments

Certain embodiments provide a method including determining a first network service state of a first communication network established between a first wireless trading device and an exchange and receiving a second network service state of a second communication network established between a second wireless trading device and the exchange. The first wireless trading device receives the second network state from the second wireless device via a shared communication link. The example method also includes determining an active communication network based on a quality-of-service metric calculated between the first communication network and the second communication network by comparing the first network service state and the second network service state. The example method also includes communicating market information related to one or more markets with the exchange utilizing the active communication network and distributing the market information via the shared communication link.

Certain embodiments provide a tangible computer readable storage medium including instructions which, when executed, cause a machine to at least determine a first network service state of a first communication network established between a first wireless trading device and an exchange and receive a second network service state of a second communication network established between a second wireless trading device and the exchange. The first wireless trading device receives the second network state from the second wireless device via a shared communication link. The instructions which, when executed, also cause the machine to determine an active communication network based on a quality-of-service metric calculated between the first communication network and the second communication network by comparing the first network service state and the second network service state. The instructions which, when executed, also cause the machine to communicate market information related to one or more markets with the exchange utilizing the active communication network and distribute the market information via the shared communication link.

Certain embodiments provide a system including a mobile computing device configured to determine a first network service state of a first communication network established between a first wireless trading device and an exchange and receive a second network service state of a second communication network established between a second wireless trading device and the exchange. The first wireless trading device receives the second network state from the second wireless device via a shared communication link. The mobile computing device is also configured to determine an active communication network based on a quality-of-service metric calculated between the first communication network and the second communication network by comparing the first network service state and the second network service state. The mobile computing device is also configured to communicate market information related to one or more markets at the exchange utilizing the active communication network and distribute the market information via the shared communication link.

Certain embodiments provide a method including assigning a first communication link to communicate a first set of information between a first wireless device and a gateway. The gateway is configured to provide access to one or more markets at an exchange. The method also includes assigning a second communication link to communicate a second set of information between a second wireless device and the gateway. The second wireless device is in communication with the first wireless device via a shared communication link, and the second set of information is different than the first set of information. The example method also includes sharing the first set of information and the second set of information between the first device and the second device via the shared communication link.

Certain embodiments provide a tangible computer readable storage medium including instructions which, when executed, cause a machine to at least assign a first communication link to communicate a first set of information between a first wireless device and a gateway. The gateway is configured to provide access to one or more markets at an exchange. The instructions which, when executed, also cause the machine to assign a second communication link to communicate a second set of information between a second wireless device and the gateway. The second wireless device is in communication with the first wireless device via a shared communication link, and the second set of information is different than the first set of information. The instructions which, when executed, also cause the machine to share the first set of information and the second set of information between the first device and the second device via the shared communication link.

Certain embodiments provide a system including a mobile computing device configured to assign a first communication link to communicate a first set of information between a first wireless device and a gateway. The gateway is configured to provide access to one or more markets at an exchange. The mobile computing device is also configured to assign a second communication link to communicate a second set of information between a second wireless device and the gateway. The second wireless device is in communication with the first wireless device via a shared communication link, and the second set of information is different than the first set of information. The mobile computing device is also configured to share the first set of information and the second set of information between the first device and the second device via the shared communication link.

II. Example Electronic Trading System

FIG. 1 illustrates a block diagram representative of an example electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication with" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130.

Market data may include data about a market for a tradeable object. For example, market data may include the inside market, market depth, last traded price ("LTP"), a last traded quantity ("LTQ"), or a combination thereof. The inside market refers to the highest available bid price (best bid) and the lowest available ask price (best ask or best offer) in the market for the tradeable object at a particular point in time (since the inside market may vary over time). Market depth refers to quantities available at price levels including the inside market and away from the inside market. Market depth may have "gaps" due to prices with no quantity based on orders in the market.

The price levels associated with the inside market and market depth can be provided as value levels which can encompass prices as well as derived and/or calculated representations of value. For example, value levels may be displayed as net change from an opening price. As another example, value levels may be provided as a value calculated from prices in two other markets. In another example, value levels may include consolidated price levels.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange, a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object; a command to initiate managing orders according to a defined trading strategy; a command to change, modify, or cancel an order; an instruction to an electronic exchange relating to an order; or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Ill. ("Trading Technologies"). As another example, the trading device 110 may be a server running a trading application providing automated trading tools such as ADL®, AUTOSPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, a group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may be implemented utilizing computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or unrequested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a cellular network, a peer-to-peer network, a T1 line, a T3 line, an integrated services digital network ("ISDN") line, a point-of-presence, the Internet, a shared memory system and/or a proprietary network such as TTNET™ provided by Trading Technologies, for example.

The gateway 120 may include one or more electronic computing platforms. For example, the gateway 120 may be implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 120 communicates with the exchange 130 using a local area network, a wide area network, a wireless network, a virtual private network, a cellular network, a peer-to-peer network, a T1 line, a T3 line, an ISDN line, a point-of-presence, the Internet, a shared memory system, and/or a proprietary network such as TTNET™ provided by Trading Technologies, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradeable objects. Unmatched trade orders may be listed for trading by the exchange 130. Once an order to buy or sell a tradeable object is received and confirmed by the exchange, the order is considered to be a working order until it is filled or cancelled. If only a portion of the quantity of the order is matched, then the partially filled order remains a working order. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. Expanded Example Electronic Trading System

Figure 2:
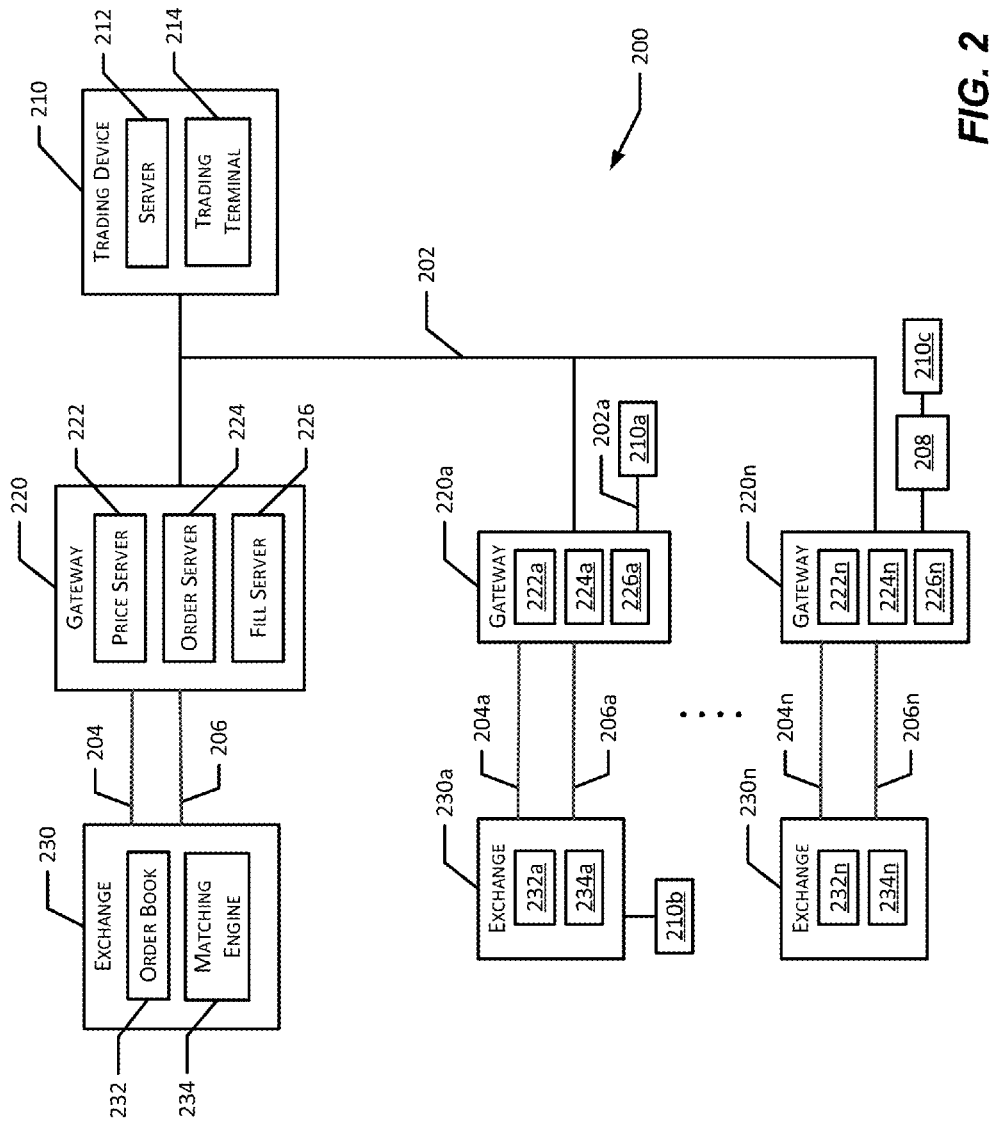
FIG. 2 illustrates a block diagram of another example electronic trading system in which certain embodiments may be employed.

FIG. 2 illustrates a block diagram of another example electronic trading system 200 in which certain embodiments may be employed. In this example, a trading device 210 may utilize one or more communication networks to communicate with a gateway 220 and exchange 230. For example, the trading device 210 utilizes network 202 to communicate with the gateway 220, and the gateway 220, in turn, utilizes the networks 204 and 206 to communicate with the exchange 230. As used herein, a network facilitates or enables communication between computing devices such as the trading device 210, the gateway 220, and the exchange 230.

The following discussion generally focuses on the trading device 210, gateway 220, and the exchange 230. However, the trading device 210 may also be connected to and communicate with "n" additional gateways (individually identified as gateways 220a-220n, which may be similar to gateway 220) and "n" additional exchanges (individually identified as exchanges 230a-230n, which may be similar to exchange 230) by way of the network 202 (or other similar networks). Additional networks (individually identified as networks 204a-204n and 206a-206n, which may be similar to networks 204 and 206, respectively) may be utilized for communications between the additional gateways and exchanges. The communication between the trading device 210 and each of the additional exchanges 230a-230n need not be the same as the communication between the trading device 210 and exchange 230. Generally, each exchange has its own preferred techniques and/or formats for communicating with a trading device, a gateway, the user, or another exchange. It should be understood that there is not necessarily a one-to-one mapping between gateways 220a-220n and exchanges 230a-230n. For example, a particular gateway may be in communication with more than one exchange. As another example, more than one gateway may be in communication with the same exchange. Such an arrangement may, for example, allow one or more trading devices 210 to trade at more than one exchange (and/or provide redundant connections to multiple exchanges).

Additional trading devices 210a-210n, which may be similar to trading device 210, may be connected to one or more of the gateways 220a-220n and exchanges 230a-230n. For example, the trading device 210a may communicate with the exchange 230a via the gateway 220a and the networks 202a, 204a and 206a. In another example, the trading device 210b may be in direct communication with exchange 230a. In another example, trading device 210c may be in communication with the gateway 220*n* via an intermediate device 208 such as a proxy, remote host, or WAN router.

The trading device 210, which may be similar to the trading device 110 in FIG. 1, includes a server 212 in communication with a trading terminal 214. The server 212 may be located geographically closer to the gateway 220 than the trading terminal 214 in order to reduce latency. In operation, the trading terminal 214 may provide a trading screen to a user and communicate commands to the server 212 for further processing. For example, a trading algorithm may be deployed to the server 212 for execution based on market data. The server 212 may execute the trading algorithm without further input from the user. In another example, the server 212 may include a trading application providing automated trading tools and communicate back to the trading terminal 214. The trading device 210 may include additional, different, or fewer components.

In operation, the network 202 may be a multicast network configured to allow the trading device 210 to communicate with the gateway 220. Data on the network 202 may be logically separated by subject such as, for example, by prices, orders, or fills. As a result, the server 212 and trading terminal 214 can subscribe to and receive data such as, for example, data relating to prices, orders, or fills, depending on their individual needs.

The gateway 220, which may be similar to the gateway 120 of FIG. 1, may include a price server 222, order server 224, and fill server 226. The gateway 220 may include additional, different, or fewer components. The price server 222 may process price data. Price data includes data related to a market for one or more tradeable objects. The order server 224 processes order data. Order data is data related to a user's trade orders. For example, order data may include order messages, confirmation messages, or other types of messages. The fill server collects and provides fill data. Fill data includes data relating to one or more fills of trade orders. For example, the fill server 226 may provide a record of trade orders, which have been routed through the order server 224, that have and have not been filled. The servers 222, 224, and 226 may run on the same machine or separate machines. There may be more than one instance of the price server 222, the order server 224, and/or the fill server 226 for gateway 220. In certain embodiments, the additional gateways 220*a*-220*n* may each includes instances of the servers 222, 224, and 226 (individually identified as servers 222*a*-222*n*, 224*a*-224*n*, and 226*a*-226*n*).

The gateway 220 may communicate with the exchange 230 using one or more communication networks. For example, as shown in FIG. 2, there may be two communication networks connecting the gateway 220 and the exchange 230. The network 204 may be used to communicate market data to the price server 222. In some instances, the exchange 230 may include this data in a data feed that is published to subscribing devices. The network 206 may be used to communicate order data to the order server 224 and the fill server 226. The network 206 may also be used to communicate order data from the order server 224 to the exchange 230.

The exchange 230, which may be similar to the exchange 130 of FIG. 1, includes an order book 232 and a matching engine 234. The exchange 230 may include additional, different, or fewer components. The order book 232 is a database that includes data relating to unmatched trade orders that have been submitted to the exchange 230. For example, the order book 232 may include data relating to a market for a tradeable object, such as the inside market, market depth at various price levels, the last traded price, and the last traded quantity. The matching engine 234 may match contra-side bids and offers pending in the order book 232. For example, the matching engine 234 may execute one or more matching algorithms that match contra-side bids and offers. A sell order is contra-side to a buy order. Similarly, a buy order is contra-side to a sell order. A matching algorithm may match contra-side bids and offers at the same price, for example. In certain embodiments, the additional exchanges 230*a*-230*n* may each include order books and matching engines (individually identified as the order book 232*a*-232*n* and the matching engine 234*a*-234*n*, which may be similar to the order book 232 and the matching engine 234, respectively). Different exchanges may use different data structures and algorithms for tracking data related to orders and matching orders.

In operation, the exchange 230 may provide price data from the order book 232 to the price server 222 and order data and/or fill data from the matching engine 234 to the order server 224 and/or the fill server 226. Servers 222, 224, 226 may process and communicate this data to the trading device 210. The trading device 210, for example, using a trading application, may process this data. For example, the data may be displayed to a user. In another example, the data may be utilized in a trading algorithm to determine whether a trade order should be submitted to the exchange 230. The trading device 210 may prepare and send an order message to the exchange 230.

In certain embodiments, the gateway 220 is part of the trading device 210. For example, the components of the gateway 220 may be part of the same computing platform as the trading device 210. As another example, the functionality of the gateway 220 may be performed by components of the trading device 210. In certain embodiments, the gateway 220 is not present. Such an arrangement may occur when the trading device 210 does not need to utilize the gateway 220 to communicate with the exchange 230, such as if the trading device 210 has been adapted to communicate directly with the exchange 230.

IV. Example Computing Device

Figure 3:
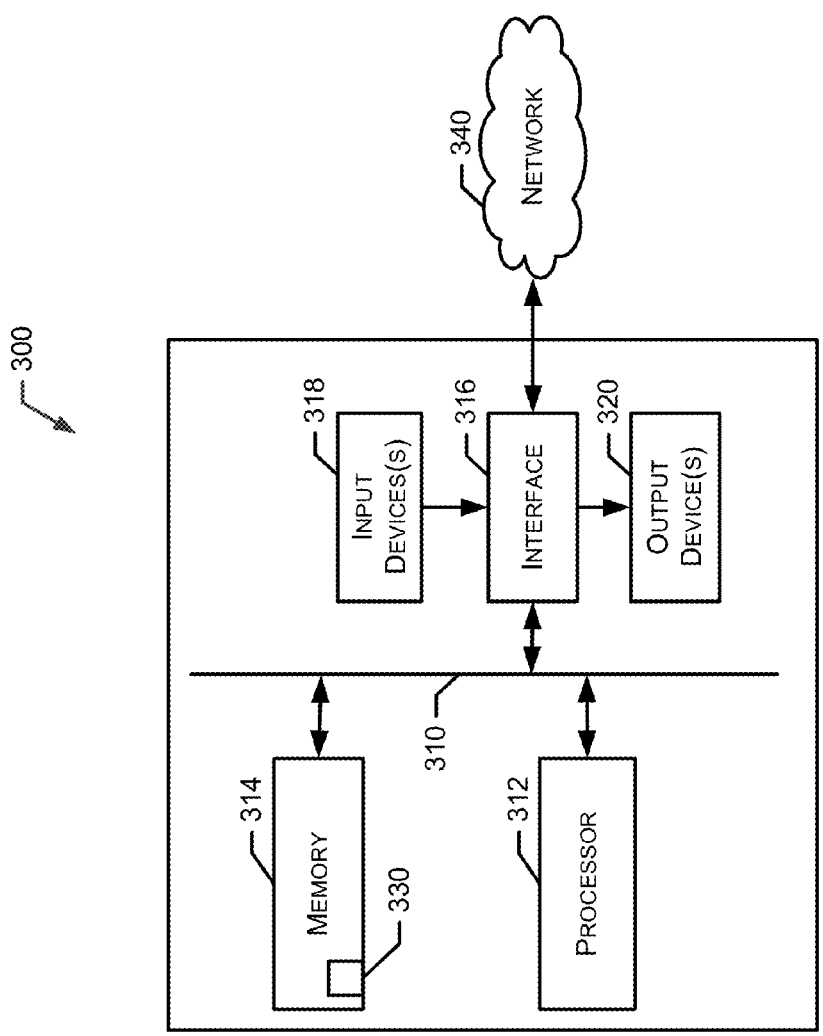
FIG. 3 illustrates a block diagram of an example computing device which may be used to implement the disclosed embodiments.

FIG. 3 illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

V. Shared Communication Links

Example methods, tangible computer storage medium, and systems of shared communication links in an electronic trading system are disclosed herein. A trading device (e.g., a mobile or portable trading device, such as a hand-held device, a laptop, a tablet, a cell phone, a portable computing device, etc.) communicates with an exchange to obtain access to one or more markets via a communication link established between the trading device and a gateway. The communication link enables the trading device to interact with the gateway. For example, the communication link may be a wireless communication network that provides a channel for communication of messages between the trading device and the gateway via wireless signals.

Communication via the trading device may be affected by one or more communication conditions. The communication conditions are functions, characteristics and/or attributes of the mobile trading device, the gateway, and/or the wireless communication network that enable, affect and/or support communication between the mobile trading device and the exchange via the communication link. The communication conditions include, for example, a strength of the signal of the wireless communication network received via the trading device (e.g., a connectivity level of the mobile trading device), and latency at a gateway server. A communication state or network service state is defined by a qualitative and/or quantitative measurement, value, and/or status of one or more communication conditions. For example, if the communication state deteriorates below a threshold state, the communication between the trading device and the exchange may be interrupted (e.g., delayed, incomplete, and/or substantially impaired). Thus, the communication state reflects an ability of the trading device to communicate with the exchange via the communication link. In some examples, the threshold state is set (e.g., by a user, automatically by a trading application, etc.). In some examples, the threshold state is a predetermined state of a communication condition at which a given amount of risk is present that the communication between the trading device and the exchange will be interrupted.

In certain examples disclosed herein a trading device is enabled to communicate with the exchange via a shared communication link and/or a shared communication network in an effort to mitigate communication interruptions with the exchange. For example, the shared communication network communicates with trading devices that, in turn, communicate with the exchange via a corresponding communication network. Market information is communicated to and/or from the trading devices by utilizing an active communication network that is based on a quality-of-service metric calculated between the communication networks of the trading devices. In some examples, each communication network has a network service state. The quality-of-service metric may be calculated by comparing the network states of each of the communication networks corresponding to the trading devices. For example, the signal strength and/or the amount of memory utilization of each trading device are compared to calculate the quality-of-service metric and, thus, determine the active communication network that is utilized to communicate the market information with the exchange.

Market information includes market data (e.g., inside market, market depth, last traded price ("LTP"), a last traded quantity ("LTQ")), an order message, fill data, or any combination thereof. For example, the inside market refers to the highest available bid price and the lowest available ask price in the market for the tradeable object at a particular point in time, and market depth refers to quantities available at price levels including the inside market and away from the inside market. An order message refers to a message that includes a trade order (e.g., a command to place an order to buy or sell a tradeable object; a command to initiate managing orders according to a defined trading strategy; a command to change, modify, or cancel an order; an instruction to an electronic exchange relating to an order). Fill data refers to data relating to one or more fills of trade orders.

To avoid an interruption in communication with the exchange, certain examples disclosed herein share market information via a shared communication link between trading devices that are in communication with the exchange. For example, a first communication link is assigned to communicate a first set of market information between a first identified trading device and the exchange, and a second communication link is assigned to communicate a second set of market information between a second identified trading devices and the exchange. The shared communication link enables the first and second sets of data to be shared between the first and second trading devices. In some examples, market information is assigned to a communication link based on a communication state or network service state of the communication link. For example, the market information may be assigned based on the signal strength and/or the amount of memory utilization of the trading device associated with each communication link.

As described in conjunction with FIG. 2 above, the example trading device 210a may be a mobile or portable trading device such as, for example, a hand-held device, a laptop, a tablet, a cell phone, a portable computing device, etc. In the current examples, the network 202a is a wireless communication network (e.g., a Wi-Fi network, a cellular or mobile network such as, for example, a Global System for Mobile Communications (GSM) network, a Personal Communications Service (PCS) network, a Digital Advanced Mobile Phone Service (D-AMPS) network, a 3 G network, a 4 G network, and/or any other wireless communication network), which may be terrestrial and/or satellite based.

When the trading device 210a is in communication with the gateway 220a, a communication link is established between the gateway 220a and the trading device 210a via the network 202a to enable the trading device 210a to interact with the gateway 220a. The communication link may be monitored by measuring the connectivity at the trading device 210a (e.g., substantially continuously, at predetermined intervals of time, based on a location of the trading device 210a, etc.). In some examples, the communication link enables the trading device 210a to communicate with the gateway 220a and/or enables the gateway 220a to respond to instructions communicated by the trading device 210a.

One or more communication conditions of the trading device 210a and/or the gateway 220a are related to the communication link. The communication conditions are functions, characteristics, and/or attributes of the trading device 210a, the gateway 220a, and/or the network 202a that enable, affect, and/or support communication between the trading device 210a and the exchange 230a via the communication link. The communication conditions include, for example, a strength of the signal of the network 202a received by the trading device 210a (e.g., a connectivity level of the trading device 210a), a remaining battery power of the trading device 210a, latency at the gateway 220a, an amount of memory utilization of the trading device 210a and/or the gateway 210a, a CPU load at the gateway 220a, and/or other communication condition(s).

A communication state or network service state is a qualitative and/or quantitative measurement, value, and/or status of one or more communication conditions. The communication state reflects an ability of the trading device 210a to communicate with the exchange 230a. In some examples, the communication state is defined by the connectivity level of the trading device 210a with the network 202a. In such examples, the communication state is defined as high, medium, intermittent, low or no connectivity and/or as a percentage of the maximum level of connectivity (e.g., 75% of the maximum level of connectivity).

In some examples, if the communication state reaches or falls below a threshold state, the communication between the trading device 210a and the exchange 230a may be interrupted (e.g., delayed, incomplete, and/or substantially impaired). In some examples, the threshold state is a predetermined state of a communication condition at which a given amount of risk is present that the communication between the trading device 210a and the exchange 230a will be interrupted. The threshold state may be based on, for example, a connectivity level of the trading device 210a, a latency period of the network 202a, available bandwidth of the trading device 210a, a percentage or rate of packet loss via the network 202a, or any combination thereof. In some examples, the threshold state is preset as an intermittent level of connectivity of the network 202a. In such examples, if the communication state of the network 202a equals or falls below (e.g., low connectivity, no connectivity) the intermittent connectivity of the threshold state, communication via the network 202a is interrupted. In some examples, the threshold state is set at a given percentage of a maximum signal strength that can be received by the trading device 210a. For example, the threshold state may be set at a predetermined percentage of the maximum level of connectivity (e.g., 50% of the maximum level of connectivity) of the network 202a. In such examples, communication via the network 202a is interrupted if the connectivity level of the network 202a is equal to or less than the predetermined percentage of the maximum level of connectivity of the threshold state.

In some examples, if a condition of the communication state falls below the threshold level, the trading device 210a is prevented from sending and/or receiving market information (e.g., market data, order messages, fill data) associated with the exchange 230a. For example, a lack of remaining battery power of the trading device 210a, insufficient connectivity, and/or any other deteriorated condition of the communication state may prevent and/or delay the trading device 210a from sending and/or receiving market information to and/or from the exchange 230a via the gateway 220a. As a result, a user is prevented from monitoring market data, taking action in the market (e.g., adding, changing, or deleting an order to buy or sell one or more tradeable objects), and receiving order updates and fill messages. To mitigate the risk of the communication between the trading device 210a and the exchange 230a from being interrupted, the trading device 210a of certain examples disclosed herein communicates with the exchange 230a via a shared communication link and/or a shared communication network.

Figure 4:
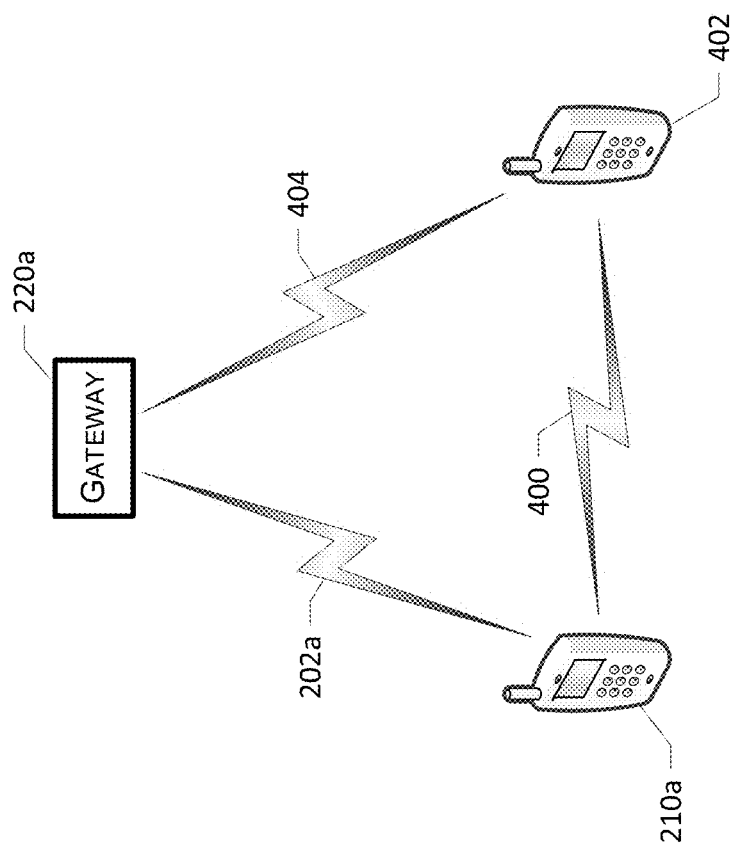
FIG. 4 illustrates an example shared communication link in accordance with the teachings herein.

An example shared communication link 400 is illustrated in FIG. 4. As illustrated in FIG. 4, two trading devices 210a, 402 in communication with the gateway 220a are in communication with each other via the shared communication link 400. For example, the trading devices 210a, 402 request market information (e.g., market data, order messages, fill data) and/or receive market information from an exchange (e.g., the exchanges 230, 230a-230n of FIG. 2) via corresponding networks 202a, 404.

In the illustrated example, each of the trading devices 210a, 402 is a mobile or portable trading device (e.g., a hand-held device, a laptop, a tablet, a cell phone, a portable computing device, etc.) and each of the networks 202a, 404 is a wireless communication network (e.g., a Wi-Fi network, a cellular or mobile network such as, for example, a Global System for Mobile Communications (GSM) network, a Personal Communications Service (PCS) network, a Digital Advanced Mobile Phone Service (D-AMPS) network, a 3 G network, a 4 G network, and/or any other wireless communication network). The shared communication link 400 is, for example, a wireless or mobile ad hoc network (e.g., a network utilizing Bluetooth protocol) in which each of the trading devices 210a, 402 is a node that communicates with the other without a router and/or any other preexisting infrastructure.

When the trading devices 210a, 402 are in communication with each other via the shared communication link 400, the communication state of at least one of the communication networks 202a, 404 may deteriorate. For example, the communication between the trading device 202a and the gateway 220a via the communication network 202a can be interrupted (e.g., delayed, rendered incomplete, substantially impaired) such that the trading device 210a is unable to send and/or receive market data from the gateway 220a via the network 202a. If the communication state of the network 404 is greater than the communication state of the network 202a and/or a threshold state, the shared communication link 400 enables the trading device 210a to send and/or receive the market information via the network 404 between the trading device 402 and the gateway 220a. Further, the shared communication link 400 enables the trading devices 210a, 402 to share market information received from the gateway 220a when communication between the trading devices 210a, 402 and the gateway 220a via the respective networks 202a, 404 is interrupted.

In some examples, the trading device 210a is assigned to communicate (e.g., send, request, receive, access, retrieve and/or obtain) a first set of market information (e.g., a first set of market data, order message, fill data, or combination thereof) and the trading device 402 is assigned to communicate a second set of market information (e.g., a second set of market data, order message, fill data, or combination thereof) that is different than the first set of market information. In some examples, each set of requested market information is assigned a unique identification number such that when the gateway 220a receives a request from one of the trading devices 210a, 402 in communication with each other, the gateway 220a provides the requested market information corresponding to the unique identification number to only one of the trading devices 210a, 402. After the requested market information is received from the gateway 220a via at least one of networks 202a, 404, the trading devices 210a, 402 share the received market information with each other via the shared communication link 400. As a result of the trading devices 210a, 402 not receiving duplicative sets of market information via the corresponding networks 202a, 404, the amount of market information communicated via the networks 202a, 404 is substantially reduced. Thus, the collective available bandwidth resources of the trading devices 210a, 402 are substantially increased.

Figure 5:
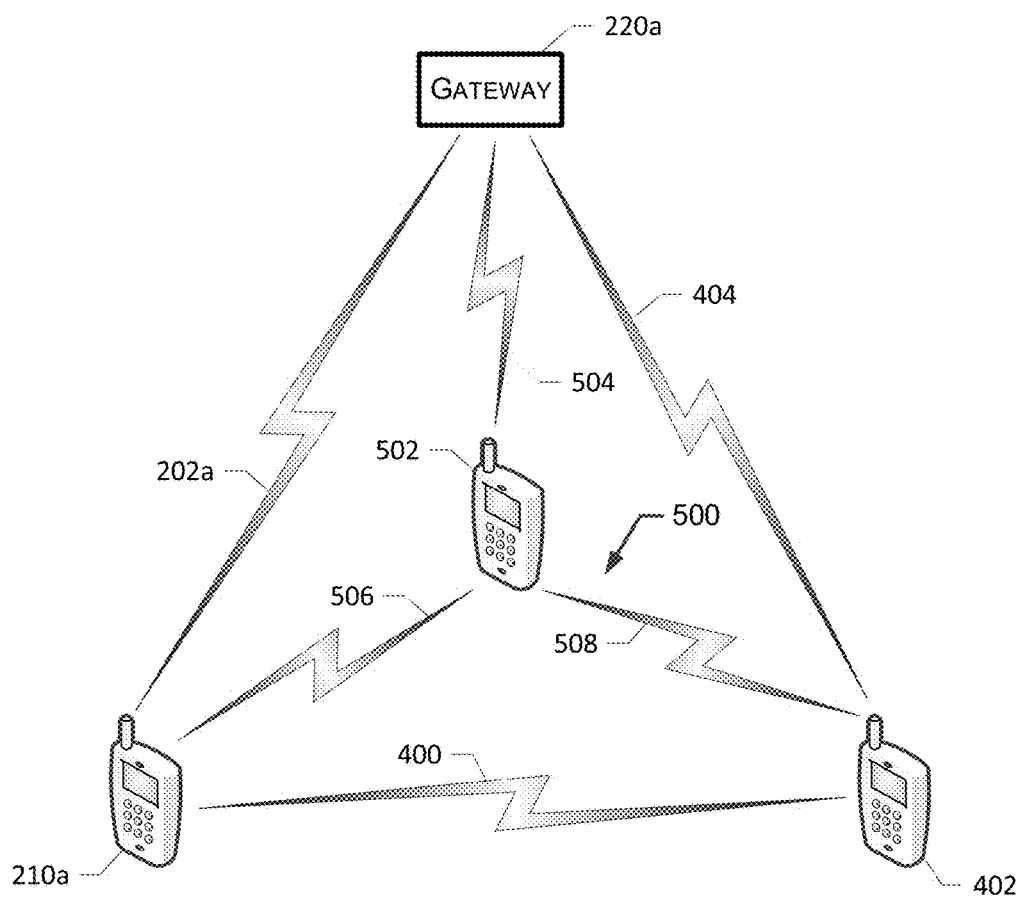
FIG. 5 illustrates an example shared communication network in accordance with the teachings herein.

FIG. 5 illustrates an example shared communication network 500. As illustrated in FIG. 3, three trading devices 210a, 402, 502 are in communication with each other via the shared communication network 500 and are in communication with the gateway 220a via corresponding networks 202a, 404, 504. In the illustrated example, the trading devices 210a, 402, 502 are mobile or portable trading devices (e.g., hand-held devices, laptops, tablets, cell phones, portable computing devices, etc.) and the networks 202a, 404, 504 are wireless communication networks (e.g., a Wi-Fi network, a cellular or mobile network such as, for example, a Global System for Mobile Communications (GSM) network, a Personal Communications Service (PCS) network, a Digital Advanced Mobile Phone Service (D-AMPS) network, a 3 G network, a 4 G network, and/or any other wireless communication network).

As illustrated in FIG. 5, the trading device 210a communicates with the trading device 210b via the shared communication link 400 of the shared communication network 500, the trading device 210a communicates with the trading device 502 via a shared communication link 506 of the shared communication network 500, and the trading device 402 is in communication with the trading device 502 via a communication link 508 of the shared communication network 500. The shared communication network 500 of the illustrated example is a wireless or mobile ad hoc network (e.g., a network utilizing Bluetooth protocol) in which each of the trading devices 210a, 402, 502 is a node that communicates with the other without a router and/or any other preexisting infrastructure. FIG. 5 is an example of the shared communication network 500 and, thus, the shared communication network 500 may be connected to other trading devices without departing from the scope of this disclosure.

When the trading devices 210a, 402, 502 are in communication with each other via the shared communication network 500, the communication state of at least one of the communication networks 202a, 404, 504 may deteriorate. For example, communication between the trading device 202a and the gateway 220a via the communication network 202a can be interrupted (e.g., delayed, rendered inoperable, substantially impaired) such that the trading device 210a is unable to send and/or receive market information via the network 202a. In some examples, the shared communication link 506 of the shared communication network 500 enables the trading device 210a to send and/or receive the market information via the network 404 if the communication state of the network 404 is greater than the communication state of the network 202a. Similarly, the shared communication link 508 of the shared communication network 500 enables the trading device 210a to send and/or receive the market information via the network 504 if the communication state of the network 504 is greater than the communication state of the network 202a. Further, the shared communication network 500 enables the trading devices 210a, 402, 502 to share the market information that each of the trading devices 210a, 402, 502 receives from the gateway 220a via each of the respective networks 202a, 404, 504.

In some examples, the trading device 210a is assigned to communicate (e.g., send, request, receive, access, retrieve and/or obtain) a first set of market information (e.g., a first set of market data, order message, fill data, or combination thereof) from the gateway 220a, the trading device 402 is assigned to communicate a second set of market information from the gateway 220a that is different than the first set of market information, and the trading device 502 is assigned to communicate a third set of market information from the gateway 220a that is different than the first and second set of market information. In some examples, each set of market information is assigned a unique identification number such that, when the gateway 220a receives a request for market information from one of the trading devices 202a, 404, 504 in communication with each other, the gateway 220a provides the market information corresponding to the unique identification number to only one of the trading devices 202a, 404, 504.

Upon the market information being received from the gateway 220a via at least one of communication networks 202a, 404, 504, the trading devices 210a, 402, 502 share the market information with each other via the shared communication link 400. As a result, the trading devices 210a, 402, 502 avoid receiving duplicative sets of market information via the corresponding networks 202a, 404, 504 and, thus, substantially reduce the amount of market information communicated via the networks 202a, 404, 504 and/or substantially increase the collective available bandwidth resources of the trading devices 210a, 402, 502.

Figure 6:
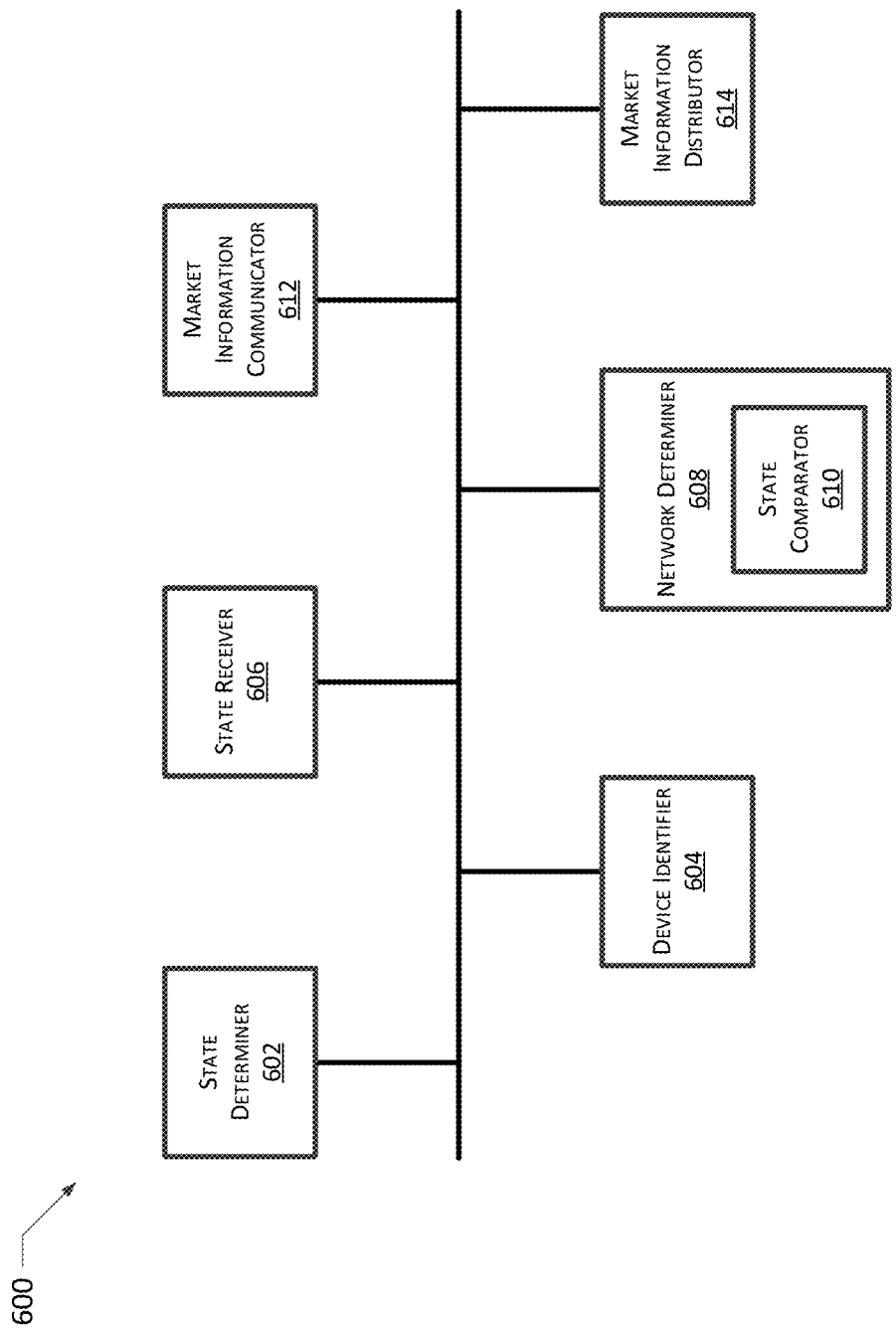
FIG. 6 illustrates a block diagram of an example system in which certain embodiments may be employed.

FIG. 6 illustrates a block diagram of an example system 600 that may be employed to distribute the market information via a shared communication link (e.g., the shared communication link 400 of FIG. 4) and/or a shared communication network (e.g., the shared communication network 500 of FIG. 5). In some examples, the system 600 is implemented as part of software and/or an application associated with the trading device 210a of FIGS. 4 and 5, the trading device 402 of FIGS. 4 and 5, the trading device 502 of FIG. 5 and/or the gateway 220a of FIGS. 4 and 5. In some examples, the system 600 is implemented as computer implemented code or instructions operable independent of software associated with the trading device 210a, the trading device 402, the trading device 502 and/or the gateway 220a. In some examples, the features and functionality of the system 600 are implemented in hardware operable in connection with the trading device 210a, the trading device 402, the trading device 502 and/or the gateway 220a.

The example system 600 of FIG. 6 includes a state determiner 602 to determine a communication state or network service state of a communication network (e.g., the network 202a of FIGS. 4 and 5) that communicatively couples a trading device (e.g., the trading device 210a of FIGS. 4 and 5) and a gateway (e.g., the gateway 220a of FIGS. 4 and 5). The network service state is defined by a qualitative and/or quantitative measurement, value, and/or status of one or more communication conditions. In some examples, the state determiner 602 determines the network service state of the communication network 202a by monitoring a connectivity level of the trading device 210a with the communication network 202a. In such examples, the connectivity level that defines the network service state is measured relative to a maximum level of connectivity. For example, the network service state may be defined as high, medium, intermittent, low or no connectivity and/or as a percentage of the maximum level of connectivity (e.g., 75% of the maximum level of connectivity). In some examples, the state determiner 602 determines the network service state of the communication network 202a by monitoring another communication condition of the trading device 210a, the gateway 220a and/or the communication network 202a, such as a remaining battery power of the trading device 210a, a geographic location of the trading device 210a, a latency of one or more servers at the gateway 220a, an amount of memory being utilized by the gateway 220a, a percentage or rate of packet loss via the network 202a, etc.

A device identifier 604 of the system 600 identifies other trading devices (e.g., the trading device 402 of FIGS. 4 and 5, the trading device 502 of FIG. 5) that are in communication with the gateway 220a. Further, the device identifier 604 of FIG. 6 may identify whether the trading device 210a is configured to communicate with the other identified trading devices 402, 502 via a share communication link (e.g., the shared communication link 400 of FIGS. 4 and 5, the shared communication link 506 of FIG. 5) and/or a shared communication network (e.g., the shared communication network 500 of FIG. 5).

In some examples, the device identifier 604 reviews one or more configuration settings of the trading device 210a to identify with which of the other trading devices 402, 502 that the trading device 210a is configured to communicate. For example, the trading device 210a can be configured to communicate with all nearby trading devices 402, 502 that are identified by the device identifier 604. Alternatively, the trading device 210a can be configured to share with only other trading devices 402, 502 identified by the device identifier 604 that are associated with the trading device 210a. For example, if the user of the trading device 210a is a member of a trading group, the trading device 210a can be configured to share market information with only trading devices 402, 502 associated with other members of the trading group. The trading device 210a can also be configured to enable a user of the trading device 210a to individually select and/or authorize the trading devices 402, 502 with which the trading device 210a is to communicate. Furthermore, the trading device 210a can be configured to not share market information with other trading devices 402, 502 and/or can be configured to share market information with only trading devices 402, 502 configured to share market information with the trading device 210a.

The example system 600 includes a state receiver 606 that receives a communication state or network service state of each communication network (e.g., the network 404 of FIGS. 4 and 5, the network 504 of FIG. 5) that communicatively couples a corresponding trading device 402, 502 with the gateway 220a. In some examples, each network service state received by the state receiver 606 is based on a connectivity level of the trading device 402, 502 with the corresponding communication network 404, 504. In such examples, the connectivity level of each network service state is measured relative to a maximum level of connectivity. For example, each network service state is defined as high, medium, intermittent, low or no connectivity and/or as a percentage of the maximum level of connectivity (e.g., 75% of the maximum level of connectivity). In some examples, the network service state of each communication network reflects other communication conditions of the communication network 404, 504, the trading device 402, 502 and/or the gateway 220a, such as a remaining battery power of the trading device 402, 502, a geographic location of the corresponding trading device 402, 502, a latency of one or more servers at the gateway 220a, an amount of memory being utilized by the gateway 220a, a percentage or rate of packet loss via the network 202a, etc.

A network determiner 608 of the example system 600 determines an active communication network that is to communicate with the gateway 220a to send and/or receive market information. The network determiner 608 of the illustrated example determines the active communication network based on a quality-of-service metric calculated between each of the communication networks 202a, 404, 504 that correspond to a trading device 210a, 402, 502 and are in communication with the gateway 220a. The active communication network includes one or more of the communication networks 202a, 404, 504 corresponding to the trading devices 210a, 402, 502.

A state comparator 610 of the network determiner 608 calculates the quality-of-service metric by comparing the network service state determined by the state determiner 602 with the network service states received by the state receiver 606. In some examples, the state comparator 610 calculates the quality-of-service metric of each communication network (e.g., the communication networks 202a, 404, 504) based on its respective network service state. In some examples, the state comparator 610 calculates a quality-of-service metric of a shared communication network (e.g., the shared communication network 500) by comparing the network service state of each of the communication networks 202a, 404, and 504 utilized by the trading devices 210a, 402, and 502 of the shared communication network 500. Examples of comparisons that may be performed by the state comparator 610 include: comparing individually calculated quality-of-service metrics to an average quality-of-service metric calculated based on the communication networks 202a, 404, and 504; ranking the communication networks 202a, 404, and 504 based on a calculated latency and/or a percentage or rate of packet loss; and comparing individual quality-of-service metrics to a baseline quality-of-service metric (e.g., a minimum acceptable service level, a service standard). In some such examples, the state comparator 610 determines the quality-of-service metric of the shared communication network 500 by comparing the respective connectivity levels of the communication networks 202a, 404, 504 of the shared communication network 500.

Based on the calculated quality-of-service metric, the network determiner 608 determines which of the communication networks 202a, 404, 504 to designate as the active communication network. In some examples, the quality-of-service metric causes the active communication network to include only the communication network having the greatest network service state. For example, if the communication network 202a has a high connectivity level and the communication networks 404, 504 have an intermittent connectivity level, the network determiner 608 assigns the communication network 202a to form the active communication network. In other such examples, the network determiner 608 assigns the communication network with the lowest latency to form the active communication network. In some examples, the quality-of-service metric causes the active communication network to include more than one communication network. For example, the active communication network may include the communication network 202a having a high connectivity level, include the communication network 404 having a medium connectivity level, and exclude the communication network 504 having an intermittent connectivity level. In other such examples, the network determiner 608 may exclude, and/or rank lower any communication network that is experiencing packet loss from the active communication network.

Further, in some examples, the state comparator 610 compares the network service state determined by the state determiner 602 and/or the network service states received by the state receiver 606 with a threshold state. The threshold state is a predetermined state or condition of the network service state at which an amount of risk is present that communication via the communication network 202a, 404, 504 will be interrupted. For example, the threshold state may be preset as an intermittent connectivity of the network 202a and/or as a predetermined percentage of the maximum level of connectivity (e.g., 50% of the maximum level of connectivity) of the network 202a. To avoid communication with the gateway 220a from being interrupted, the network determiner 608 may exclude a communication network 202a, 404, 504 from the active communication network if the state comparator 610 determines that the corresponding network service state is less than or equal to the threshold state. For example, if the network service state of the communication network 504 is an intermittent connectivity level and the threshold state is a medium connectivity level, the network determiner 608 excludes the communication network 504 from the active communication network.

The example system 600 includes a market information communicator 612 to send and/or receive market information (e.g., market data, order messages, fill data) via the active communication network. For example, the market information communicator 612 accesses market data, order messages and/or fill data related to one or more markets at an exchange (e.g., the exchange 230a of FIG. 2) via the active communication network and the gateway 220a. Further, the market information communicator 612 may send order messages (e.g., commands to change, modify, or cancel orders) to the exchange 220a and/or receive order updates and fill data via the active communication network.

In some examples, the market information communicator 612 determines which trading device 210a, 402, 502 is to send and/or receive each set of market information. In some examples, if market information is requested by more than one trading device 210a, 402, 502, the market information communicator 612 assigns which communication network 202a, 404, 504 of the active communication network is to communicate (e.g., send, request, access, receive, retrieve and/or obtain) the commonly requested market information to and/or from the gateway 220a. For example, if the active communication network includes two communication networks (e.g., the communication networks 202a, 404) that each correspond to a trading device (e.g., the trading devices 210a, 402) requesting the same market information, the market information communicator 612 may assign the first of the two communication networks (e.g., the communication network 202a) to communicate a first set of market information and assign the second of the two communication networks (e.g., the communication network 404) to communicate a second set of market information different than the first set of market information. In some examples, the market information communicator 612 assigns each set of market information a unique identification number to help ensure that the gateway 220a does not provide duplicative sets of market information to the trading devices 210a, 402, 502 in communication with each other. A market information distributor 614 of the example system 600 distributes or shares the accessed market information between the trading devices 210a, 402, 502 via a shared communication link (e.g., the shared communication link 400 of FIGS. 4 and 5, the shared communication link 506 of FIG. 5, the shared communication link 508 of FIG. 5) and/or a shared communication network (e.g., the shared communication network 500 of FIG. 5).

Figure 7:
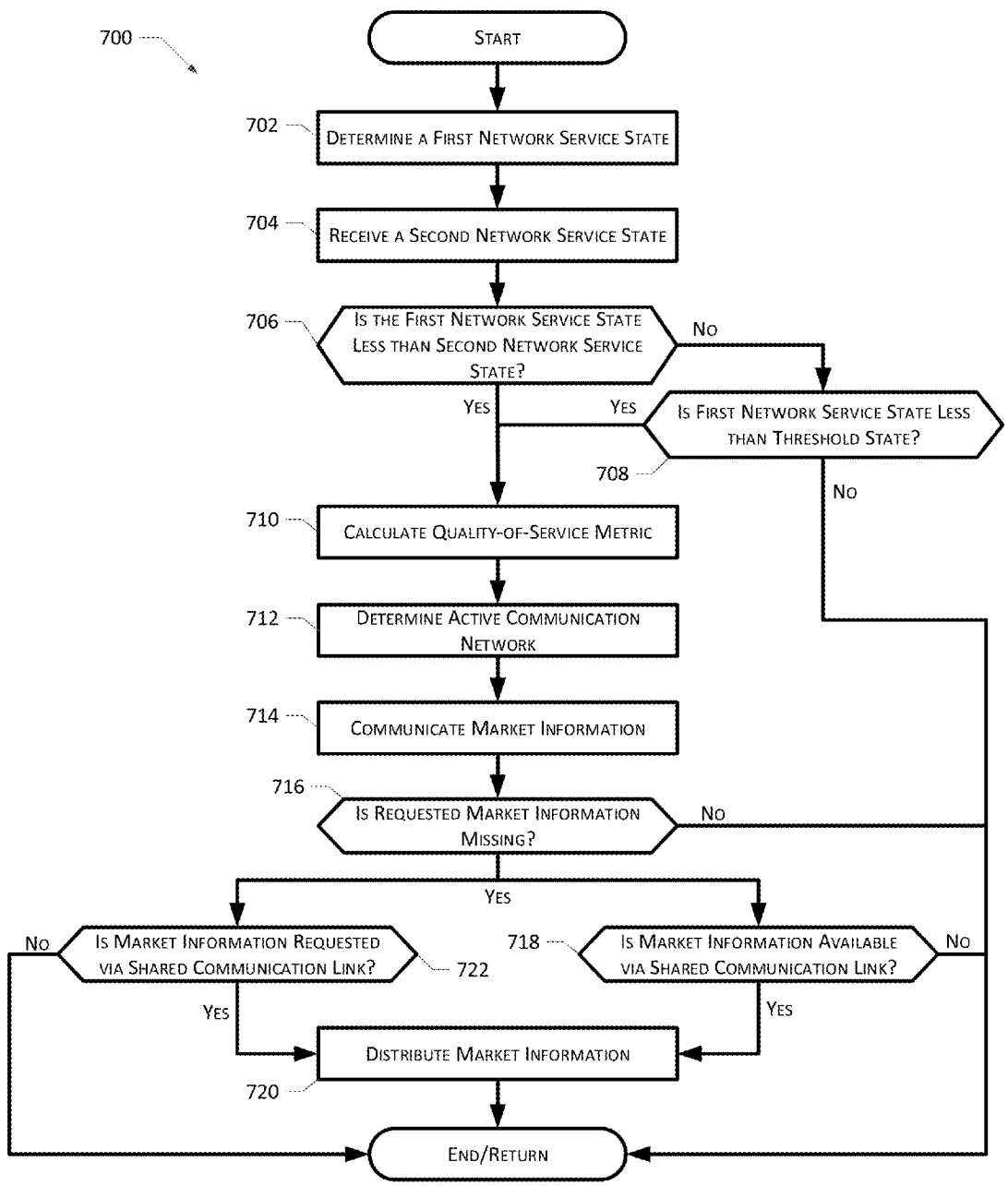
FIG. 7 illustrates an example method to share market information via a shared communication link.

FIG. 7 illustrates an example method 700 to share market information (e.g., market data, order messages, fill data) via a shared communication link in an electronic trading system. The example method 700 may be performed by any wireless trading device (e.g., the trading devices 210a, 402 of FIG. 4) and/or gateway (e.g., the gateway 220a of FIG. 4). The example method 700 includes the state determiner 602 determining a first communication state or network service state of a first communication network (e.g., the network 202a of FIG. 4) established between a first wireless trading device (e.g., the trading device 210a of FIG. 4) and a gateway (e.g., the gateway 220a of FIG. 4) (block 702). For example, the first network service state is determined by evaluating one or more communication conditions of the first trading device 210a and/or the gateway 220a such as a connectivity level of the first trading device 210a, a latency period of the network 202a, available bandwidth of the trading device 210a, a percentage or rate of packet loss via the network 202a, or any combination thereof. In some examples, the first network service state is measured relative to a maximum level of connectivity and is defined as high, medium, intermittent, low or no connectivity and/or as a percentage of the maximum level of connectivity (e.g., 75% of the maximum level of connectivity). The example method 700 also includes the state receiver 606 receiving a second network service state of a second communication network (e.g., the network 404 of FIG. 4) in communication with a second wireless trading device (e.g., the trading device 402 of FIG. 4) (block 704). The second network service state reflects one or more communication conditions of the second trading device 402 and/or the gateway 220a such as a connectivity level of the second trading device 402, a latency period of the network 404, available bandwidth of the trading device 402, a percentage or rate of packet loss via the network 404, or any combination thereof.

In response to the first network service state being determined (block 702) and the second network service state being received (block 704), the state comparator 610 of the network determiner 608 compares the first network service state and the second network service state (block 706). If the first network service state (e.g., high connectivity) is not less than (e.g., is greater than or equal to) the second network service state (e.g., low connectivity), the state comparator 610 compares the first network service state to a predetermined threshold state (block 708). For example, the threshold value may be preset by a user or manufacturer to equal an intermittent connectivity between the first trading device 210a and the communication network 202a. If the first network service state (e.g., high connectivity) is not less than (e.g., is greater than or equal to) the threshold state (e.g., intermittent connectivity), the example method 700 ends and/or returns to the start. Thus, in some examples in which the first network service state is not less than the second network service state and the threshold state, the first trading device 210a may send and/or receive market information data to and/or from the gateway 220a via the communication network 202a without sharing market information via a communication link.

Conversely, if the first network service state (e.g., 25% of the maximum level of connectivity) is less than the second network service state (e.g., 75% of the maximum level of connectivity) (block 706) or is less than the threshold state (e.g., 50% of the maximum level of connectivity) (block 708), the state comparator 610 of the network determiner 608 calculates a quality-of-service metric between the first communication network 202a and the second communication network 404 (block 710). The state comparator 610 calculates the quality-of-service metric by comparing the first network service state with the second network service state. In some examples, the state comparator 610 calculates the quality-of-service metric of each of the communication networks 202a, 404 based on their respective network service states. In some examples, the state comparator 610 calculates a quality-of-service metric of a shared communication network (e.g., the shared communication network 500) by comparing the network service state of each of the communication networks 202a, 404 of the shared communication network 500. In some such examples, the quality-of-service metric is calculated by comparing the connectivity level of the first communication network 202a with the connectivity level of the second communication network 404.

Based on the calculated quality-of-service metric, the network determiner 608 determines an active communication network that is to communicate (e.g., send, request, access, receive, retrieve and/or obtain) market information to and/or from an exchange (e.g. the exchange 230a of FIG. 2) via the gateway 220a (block 712). The active communication network includes the first communication network 202a and/or the second communication network 404. In some examples, the quality-of-service metric causes the active communication network to include only the communication network having the greater network service state. For example, the active communication network includes only the communication network 202a if the communication network 202a has a high connectivity level and the communication network 404 has an intermittent connectivity level.

Upon the active communication network being determined, the market information communicator 612 communicates market information related to one or more markets at the exchange 230a via the active communication network and the gateway 220a (block 714). In some examples in which the first network service state of the first communication network 202a is less than the threshold state, the market information communicator 612 sends order messages (e.g., commands to change, modify, or cancel orders), accesses market data and/or receives order updates and fill data that were requested by the first trading device 210a via the second communication network 404 of the active communication network.

Thus, the market information requested by the first trading device 202a is communicated to and/or from the gateway 220a when communication via the first communication network 202a is interrupted (e.g., delayed, substantially impaired, lost). For example, if communication between the first trading device 210a and the gateway 220a via the first communication network 202a is interrupted to the extent that the first trading device 210a is unable to send, request, access, receive, retrieve and/or obtain market information via the first communication network 202a, the shared communication link 400 enables the first trading device 210a to send, request, access, receive, retrieve and/or obtain the market information via the second communication network 404.

In some examples in which the first and second network service states are greater than the threshold state, the market information communicator 612 determines if any market information is requested by both the first trading device 210a and the second trading device 402. To reduce the amount of market information communicated via the active communication network, the market information communicator 612 assigns each communication network 202a, 404 of the active communication network to communicate a different set of the commonly requested market information. For example, the market information communicator 612 may assign the first communication network 202a to communicate a first set of commonly requested market information and may assign the second communication network 404 to communicate a second set of commonly requested market information different than the first set of market information. In some examples, the market information communicator 612 assigns each set of market information a unique identification number to help ensure that the gateway 220a does not provide duplicative sets of market information to the trading devices 210a, 402 in communication with each other.

If neither the first trading device 210a nor the second trading device 402 are missing any requested market information (block 716), the example method 700 ends and/or returns to the start. Conversely, if either the first trading device 210a or the second trading device 402 is missing requested market information (block 716), the market information distributor 614 distributes the requested market information via a shared communication link (e.g., the shared communication link 400 of FIG. 4). For example, if the first trading device 210a is missing requested market information (e.g., market data, order updates, and/or fill data) that is available via the shared communication link 400 (block 718), the market information distributor 614 distributes the missing market information from the second trading device 402 to the first trading device 210a via the shared communication link 400 (block 720). Further, if the first trading device 210a has accessed market information (e.g., market data, order updates and/or fill data) that the second trading device 402 has requested and is missing (block 722), the market information distributor 614 distributes the missing market information from the first trading device 210a to the second trading device 402 via the shared communication link 400 (block 720). After the market information is distributed, the method 700 ends and/or returns to the start.

Figure 8:
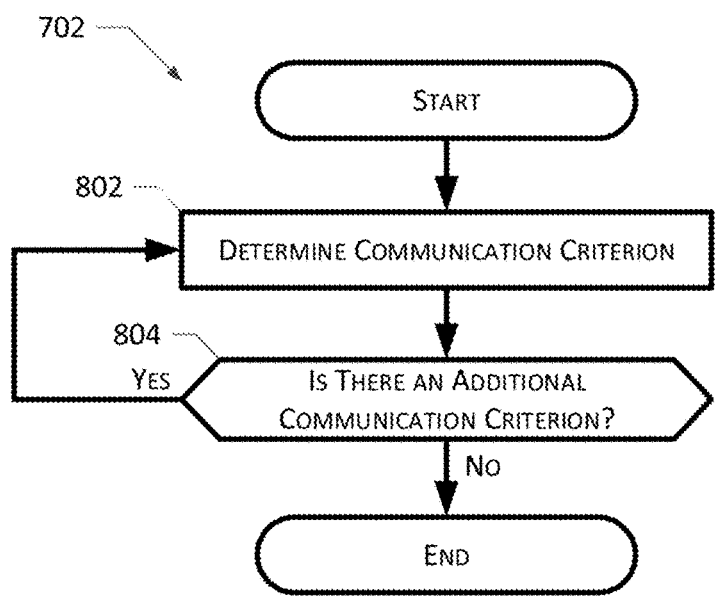
FIG. 8 illustrates an example method to determine a network service state which may be employed within the method of FIG. 7.

FIG. 8 illustrates additional detail regarding the example method 702 of determining the first network service state of the first trading device 210a. In the illustrated example, determining the first network service state begins by the state determiner 602 determining a first communication criterion of the first network service state (block 802). For example, the first communication criterion may be a connectivity level of the first trading device 210a (e.g., a signal strength of the first communication network 202a). In some examples, the connectivity level of the first trading device 210a is measured relative to a maximum level of connectivity. For example, the first network service state may be defined as high, medium, intermittent, low or no connectivity and/or as a percentage of a maximum level of connectivity (e.g., 75% of the maximum level of connectivity).

After the first communication criterion is determined, the state determiner 602 identifies whether there is another communication criterion to determine (block 804). If there is no other communication criterion, the method 702 of determining the service state ends. Otherwise, if there is another communication criterion to determine, the state determiner 602 determines a second communication criterion (block 802). For example, the second communication criterion may be a remaining battery power of the first trading device 210a. In some examples, the remaining battery power of the first trading device 210a may be defined as a full, medium, low or no battery power and/or as a percentage of a fully charged battery (e.g., 40% of a fully charged battery). A communication link associated with a trading device having at least a certain threshold level of battery power may be selected over a communication link associated with a trading device having less than the threshold of battery power, for example. Blocks 802 and 804 of the example method 702 are repeated until all available communication criteria are determined. For example, the blocks 802 and 804 of FIG. 8 may be repeated to determine a latency at the gateway 220a, an amount of memory utilization of the first trading device 210a, an amount of memory utilization of the gateway 220a, a CPU load at the gateway 220a, a percentage or rate of packet loss via the network 202a, and/or other communication criteria. As illustrated in the method 700 of FIG. 7, the determined network communication criterion(-ia) are provided as the first network service state, which can then be compared to the second network service state (which may have been similarly determined).

Figure 9:
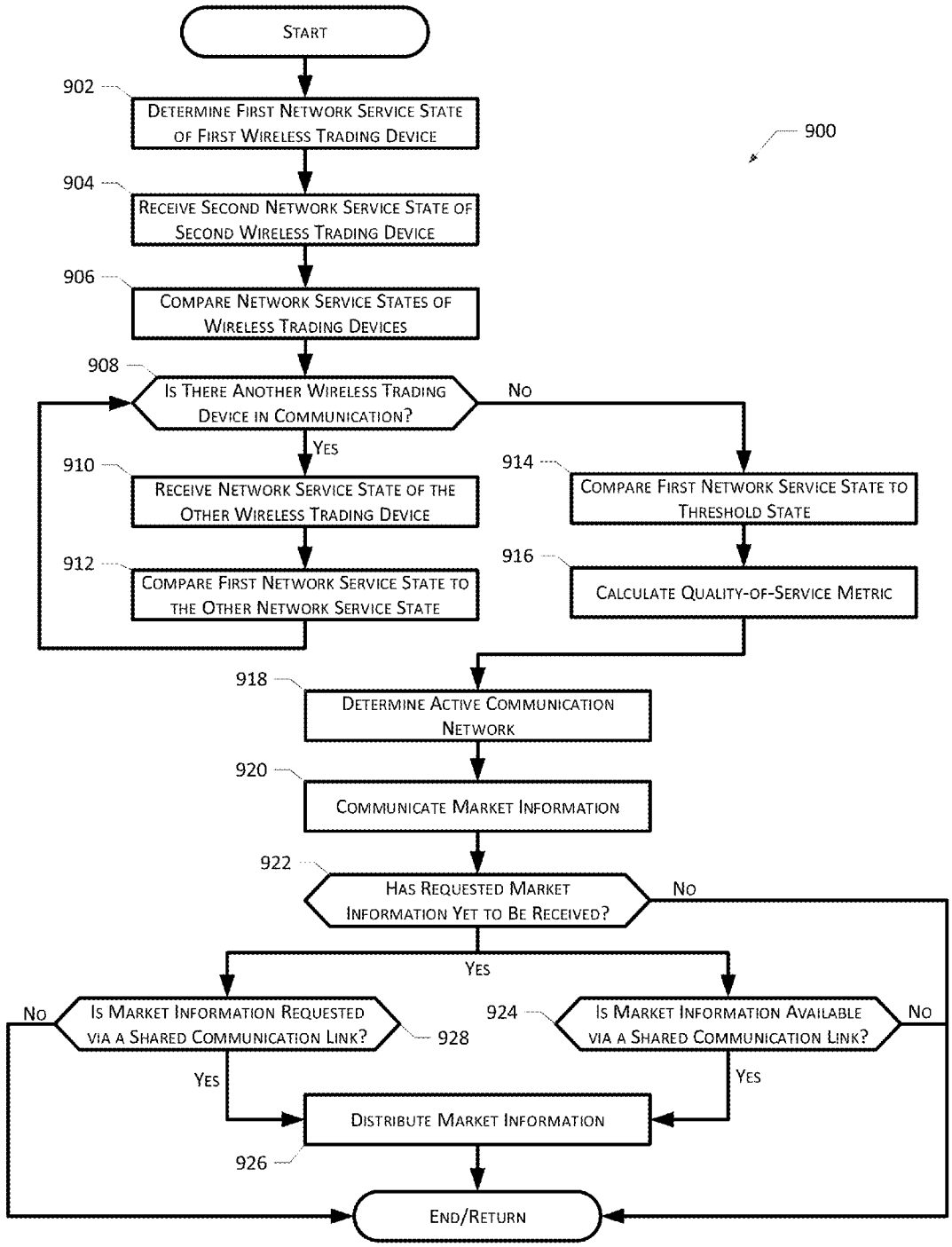
FIG. 9 illustrates another example method to share market information via a shared communication network.

FIG. 9 illustrates another example method 900 to share market information (e.g., market data, order messages, fill data) via shared communication links of a shared communication network in an electronic trading system. The example method 900 may be performed by any wireless trading device (e.g., the trading devices 210a, 402, 502 of FIG. 5) and/or gateway (e.g., the gateway 220a of FIG. 5). The example method 900 includes the state determiner 602 determining a first communication state or network service state of a first communication network (e.g., the network 202a of FIG. 5) established between a first wireless trading device (e.g., the trading device 210a of FIG. 5) and a gateway (e.g., the gateway 220a of FIG. 5) (block 902). In some examples, the first network service state is determined by evaluating one or more communication criterion of the first wireless trading device 202a and/or the gateway 220a. For example, the first network service state may be determined utilizing the method illustrated in FIG. 8.

The example method 900 also includes the state receiver 606 receiving a second network service state of a second communication network (e.g., the network 404 of FIG. 5) in communication with a second wireless trading device (e.g., the trading device 402 of FIG. 5) (block 904). The second network service state reflects one or more communication criterion of the second trading device 402 and/or the gateway 220a (which, for example, may also have been determined using the method illustrated in FIG. 8). Upon the first network service state being determined (block 902) and the second network service state being received (block 904), the state comparator 610 of the network determiner 608 compares the first network service state and the second network service state (block 906). For example, if the first and second network service states are based on the connectivity of the respective first and second wireless trading devices 210a, 402, the state comparator compares the connectivity level of the wireless trading device 210a with the communication network 202a to the connectivity level of the wireless trading device 402 with the communication network 404.

The method 900 of FIG. 9 includes the device identifier 604 identifying whether there is another wireless trading device in communication with the gateway 220a (block 908). In some examples, the device identifier 604 reviews configuration settings of each identified wireless trading device to verify that the wireless trading device is configured to communicate and/or share market information with other wireless trading devices (e.g., the first and second trading devices 210a, 402). If another wireless trading device (e.g., the third trading device 502 of FIG. 5) is identified, the state receiver 606 receives a network service state of a communication network (e.g., the communication network 504) in communication with the other wireless trading device 502 (block 910). In some examples, the network service state has been determined using the method illustrated in FIG. 8. The other network service state of the other communication network 504 reflects one or more communication criterion of the other wireless trading device 502 and/or the gateway 220a. The state comparator 608 of the network determiner 610 compares the first network service state of the first communication network 202a with the other network service state of the other communication network 504 (block 912). For example, if the first and other network service states are based on the connectivity of the respective first and other trading devices 210a, 402, the state comparator compares the connectivity level of the trading device 210a with the communication network 202a to the connectivity level of the trading device 402 with the communication network 404. The device identifier 604 again identifies whether there is another wireless trading device in communication with the gateway (block 908). If yet another wireless trading device is identified, blocks 910 and 912 are repeated.

Otherwise, the network determiner 608 of the state comparator 610 compares the first network service state of the first network communication 202a to a threshold state (block 914). In some examples, the threshold state is a predetermined state of a communication condition at which a given amount of risk is present that the communication between the trading device 210a and the gateway 220a will be interrupted. For example, the threshold state may be based on a connectivity level of the trading device 210a, a latency at the gateway 220a, an amount of memory utilization of the first trading device 210a, an amount of memory utilization of the gateway 220a, a CPU load at the gateway 220a, available bandwidth of the trading device 210a, a percentage or rate of packet loss via the network 202a, or any combination thereof. In some examples, the threshold state is preset as an intermittent connectivity of the network 202a and/or a predetermined percentage of the maximum level of connectivity (e.g., 50% of the maximum level of connectivity) of the network 202a. If the communication state of the network 202a equals or falls below the predetermined connectivity level of the threshold state, communication via the network 202a may be interrupted.

In the example method 900 of FIG. 9, the network determiner 608 calculates a quality-of-service metric (block 916). In some examples, the state comparator 610 of the network determiner 608 calculates the quality-of-service metric of each communication network (e.g., the communication networks 202a, 404, 504) based on its respective network service state. In some examples, the state comparator 610 calculates a quality-of-service metric of a shared communication network (e.g., the shared communication network 500) by comparing the network service state of each of the communication networks 202a, 404, 504 of the shared communication network 500. In some such examples, the quality-of-service metric is calculated by comparing the first network service state with the second network service state, any other network service state and/or the threshold state. In other such examples, the state comparator 610 determines the quality-of-service metric of the shared communication network 500 by comparing the respective connectivity levels of the communication networks 202a, 404, 504 of the shared communication network 500.

Based on the quality-of-service metric, the network determiner 608 determines an active communication network that is to communicate (e.g., send, request, access, receive, retrieve and/or obtain) market information to and/or from an exchange (e.g. the exchange 230a of FIG. 2) via the gateway 220a (block 918). The active communication network includes the first communication network 202a, the second communication network 404 and/or any other identified communication network (e.g., the other communication network 504). Upon the active communication network being determined, the market information communicator 612 communicates market information related to one or more markets at the exchange 230 via the active communication network and the gateway 220 (block 920). In some examples, if communication via the one of the communication networks (e.g., the first communication network 202a) is interrupted (e.g., delayed, substantially impaired, lost) to the extent that the respective trading device (e.g., the first trading device 210a) is unable to communicate market information via the communication network, the shared communication network 500 enables the trading device to request and/or receive the market information via another communication network.

In some examples in which the first network service state is less than the threshold state, the market information communicator 612 accesses market information requested by the first trading device 210a via the second communication network 404 and/or another identified communication network (e.g., the other communication network 504) of the active communication network. Thus, the market information requested by the first trading device 210a is accessed from the gateway 220a when communication via the first communication network 202a is interrupted. In some examples in which the first network service state is greater than the threshold state, the market information communicator 612 determines if any market information (e.g., market data, order messages, fill data) is requested by two or more of the wireless trading devices (e.g., the first and second trading devices 210a, 402).

To reduce the amount of market information communicated via the active communication network, the market information communicator 612 assigns the communication networks 202a, 404, 504 of the active communication network to access different sets of the commonly requested market information. For example, the market information communicator 612 may assign the first communication network 202a to access a first set of commonly requested market information, the second communication network 404 to access a second set of commonly requested market information different than the first set of market information, and the other identified communication network 504 to access a third set of commonly requested market information different than the first and second sets of market information. In some examples, the market information communicator 612 assigns a unique identification number to each set of market information to ensure that the gateway 220a does not provide duplicative sets of market information to the trading devices 210a, 402, 502 in communication with each other.

If each of the trading devices 210a, 402, 502 has received the market information that it had requested (e.g., no trading device is missing market information that it had requested) (block 922), the method 900 of FIG. 9 ends and/or returns to the start. In some examples, each of the trading devices 210a, 402, 502 does not share market information via a shared communication network. Conversely, if any of the first trading device 210a, the second trading device 402, or the other trading device 502 has yet to receive market information that it had requested (block 922), the market information distributor 614 distributes the market information via a shared communication network (e.g., the shared communication network 500 of FIG. 5).

For example, if one of the trading devices (e.g., the first trading device 210a) has yet to receive requested market information (e.g., market data, order updates and/or fill data) that is available via the shared communication network 500 (block 924), the market information distributor 614 distributes the missing market information to the first trading device 210a from the second wireless trading device 402 via a shared communication link (e.g., the shared communication link 400 of FIG. 5) and/or from the other identified trading device 502 via another shared communication link (e.g., the shared communication link 506 of FIG. 5) of the shared communication network 500 (block 926). Further, if the first trading device 210a has obtained (e.g., received, accessed and/or retrieved) market information that another wireless trading device (e.g., the second trading device 402, the other trading device 502) has requested and is missing (block 928), the market information distributor 614 distributes the market information from the first trading device 210a to the second trading device 402 and/or the other trading device 502 via the shared communication network 500 (block 926). The example method 900 ends and/or returns to the start after the market information is distributed between the trading devices 210a, 402, 502.

Figure 10:
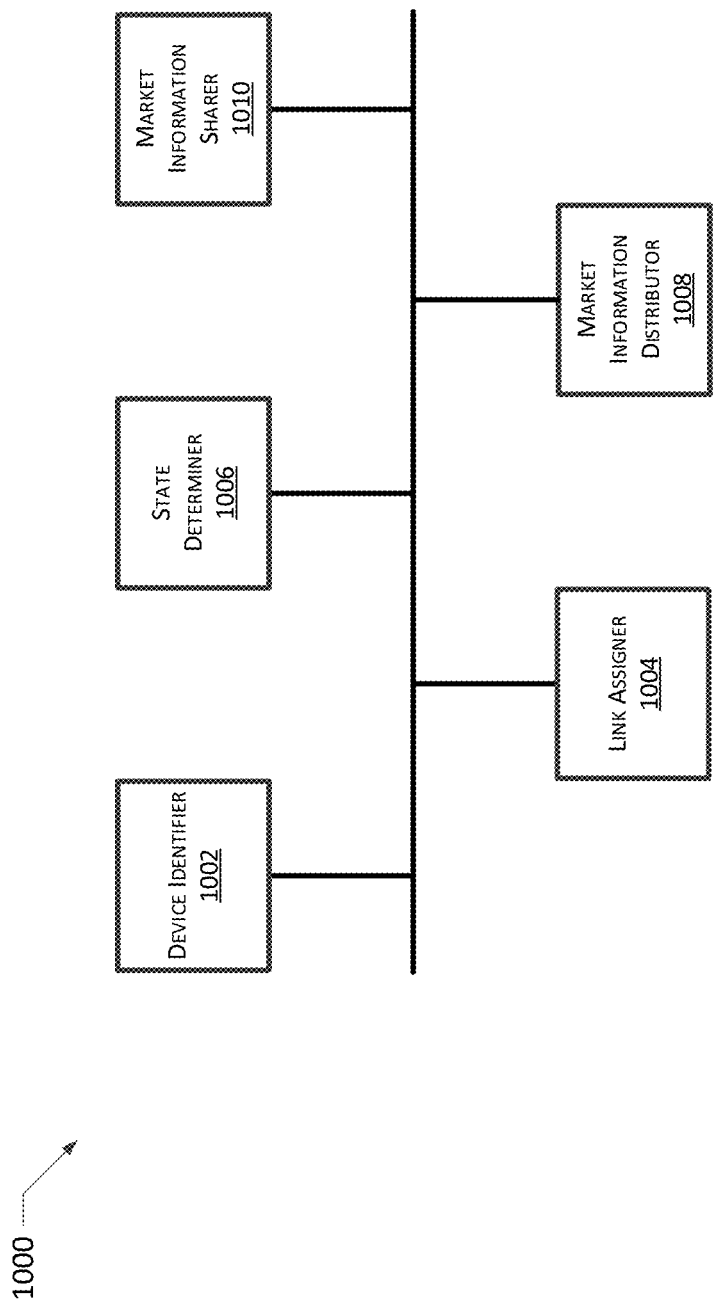
FIG. 10 illustrates a block diagram of another example system in which certain embodiments may be employed.

FIG. 10 illustrates a block diagram of another example system 1000 that may be employed to distribute information (e.g., market information such as market data, order messages, fill data) via a shared communication link (e.g., the shared communication link 400 of FIG. 4) and/or a shared communication network (e.g., the shared communication network 500 of FIG. 5). In some examples, the system 1000 is implemented as part of software and/or an application associated with the trading device 210a of FIGS. 4 and 5, the trading device 402 of FIGS. 4 and 5, the trading device 502 of FIG. 5 and/or the gateway 220a of FIGS. 4 and 5. In some examples, the system 1000 is implemented as computer implemented code or instructions operable independent of software associated with the trading device 210a, the trading device 402, the trading device 502 and/or the gateway 220a. In some examples, the features and functionality of the system 1000 are implemented in hardware operable in connection with the trading device 210a, the trading device 402, the trading device 502 and/or the gateway 220a.

The system 1000 of FIG. 10 includes a device identifier 1002 that identifies wireless devices (e.g., the trading device 210a of FIGS. 4 and 5, the trading device 402 of FIGS. 4 and 5, the trading device 502 of FIG. 5) in communication with a gateway (e.g., the gateway 220a of FIGS. 4 and 5). For example, the device identifier 1002 identifies a first wireless device (e.g., the trading device 210a of FIGS. 4 and 5), a second wireless device (e.g., the trading device 402 of FIGS. 4 and 5), and a third wireless device (e.g., the trading device 502 of FIG. 5).

In some examples, the device identifier 1002 determines whether each of the identified wireless devices (e.g., the wireless device 210a) is configured to communicate with any of the other identified wireless devices (e.g., the wireless devices 402, 502) via a share communication link (e.g., the shared communication link 400 of FIGS. 4 and 5, the shared communication link 506 of FIG. 5, the shared communication link 508 of FIG. 5) and/or a shared communication network (e.g., the shared communication network 500 of FIG. 5). For example, the wireless device 210a can be configured to communicate with all nearby wireless devices. Alternatively, the wireless device 210a can be configured to share with only other wireless devices associated with the wireless device. For example, if a user of the wireless device 210a is a member of a trading group, the wireless device can be configured to share market information with only those wireless devices associated with other members of the trading group. Furthermore, the wireless device 210a can be configured to enable the user to individually select and/or authorize the other wireless devices with which the wireless device is to communicate. The wireless device 210a also can be configured to withhold market information from other wireless devices and/or to share market information with only other wireless devices configured to share market information with the wireless device 210a.

A link assigner 1004 of the example system 1000 assigns a unique communication link between each of the identified wireless devices 210a, 402, 502 and the gateway 220a. For example, the link assigner 1004 assigns a first communication link (e.g., the network 202a of FIGS. 4 and 5) between the first wireless device 210a and the gateway 220a, a second communication link (e.g., the network 404 of FIGS. 4 and 5) between the second wireless device 402 and the gateway 220a, and a third communication link (e.g., the network 504 of FIG. 5) between the third wireless device 502 and the gateway 220a.

The example system 1000 includes a state determiner 1006 that determines a communication state or network service state for each of the assigned communication links 202a, 404, 504. For example, the state determiner 1006 determines a first communication state of the first communication link 202a, a second communication state of the second communication link 404, and a third communication state of the third communication link 504. In some examples, the state determiner 602 determines the network service state of each of the communication networks 202a, 404, 504 by measuring a connectivity level of the corresponding trading device 210a, 402, 502 with the communication network 202a, 404, 504 relative to a maximum level of connectivity. For example, the network service state may be defined as high, medium, intermittent, low or no connectivity and/or as a percentage of the maximum level of connectivity (e.g., 75% of the maximum level of connectivity). In some examples, the state determiner 1006 determines the communication state of each communication link 202a, 404, 504 by monitoring one or more other communication conditions of the corresponding wireless device 210a, 402, 502, the gateway 220a and/or the communication link 202a, 404, 504, such as, a remaining battery power of the corresponding wireless device 210a, 402, 502, a geographic location of the corresponding wireless device 210a, 402, 502, a latency of one or more servers at the gateway 220a, an amount of memory being utilized by the gateway 220a, a percentage or rate of packet loss via the communication link 202a, 404, 504, etc.

A market information distributor 1008 of the example system 1000 assigns each communication link 202a, 404, 504 to communicate a unique set of information between the gateway 220a and the corresponding wireless device 210a, 402, 502 based on the communication state of each of the identified wireless devices 210a, 402, 502. For example, the market information distributor 1008 assigns the first communication link 202a to communicate a first set of information (e.g., a first set of market information such as market data, order messages, fill data) between the first wireless device 210a and the gateway 220a, the second communication link 404 to communicate a second set of information (e.g., a second set of market information such as market data, order messages, fill data) between the second wireless device 402 and the gateway 220a, and the third communication link 504 to communicate a third set of information (e.g., a third set of market information such as market data, order messages, fill data) between the third wireless device 502 and the gateway 220a. In some examples, the market information distributor 1008 assigns each set of information a unique identification number to prevent the gateway 220a from providing duplicative sets of information to the wireless devices 210a, 402, 502 in communication with each other. In such examples, the gateway 220a provides information associated with a unique identification number to a wireless device (e.g., the wireless device 210a) only if the gateway has yet to provide the market information associated with the unique identification number to any of the wireless devices (e.g., the wireless devices 210a, 402, 502) in communication with each other.

In some examples, the market information distributor 1008 determines if any information (e.g., market information such as market data, order messages, fill data) is requested by two or more of the wireless devices 210a, 402, 502. To reduce the amount of data communicated via the assigned communication links 202a, 404, 504, the market information distributor 1008 apportions the commonly requested information between the communication links 202a, 404, 504. For example, the market information distributor 1008 may assign the first communication link 202a to access a first set of commonly requested information, the second communication link 404 to access a second set of commonly requested information different than the first set of information, and the third communication link 504 to access a third set of commonly requested market information different than the first and second sets of information. In some examples, the amount of data the market information distributor 1008 assigns to a communication link corresponds to the communication state of the communication link. For example, the largest and/or most frequently updated set of information may be assigned to the communication link with a high connectivity level, and the smallest and/or least frequently updated set of information may be assigned to the communication link with a low connectivity level. In other examples, the market information distributor 1008 assigns the communication network with the lowest latency to form the active communication network.

The market information distributor 1008 communicates (e.g., sends, requests, receives, accesses, retrieves and/or obtains) each set of information to and/or from the gateway 220a via the corresponding assigned communication link 202a, 404, 504. In examples in which there is commonly requested information, the market information distributor 1008 prioritizes communication of the commonly requested information. For example, the market information distributer 1008 sends, requests, receives, accesses and/or retrieves the first set of commonly requested information via the first communication link 202a prior to communicating information that is only sought by the first wireless device 210a.

In some examples, the market information distributor 1008 is associated with only one of the wireless devices (e.g., a lead wireless device) identified by the device identifier 1002. In some such examples, the state determiner 1006 selects the lead wireless device associated with the market information distributor 1008 based on the communication states of the communication links 202a, 404, 504. In some examples, the state determiner 1006 may select the wireless device having the most available resources (e.g., RAM, CPU, connectivity level, etc.) to be the lead wireless device.

The example system 1000 includes a market information sharer 1010 that distributes or shares obtained (e.g., received, retrieved, accessed) information via a shared communication link (e.g., the shared communication link 400 of FIGS. 4 and 5, the shared communication link 506 of FIG. 5, the shared communication link 508 of FIG. 5) and/or a shared communication network (e.g., the shared communication network 500 of FIG. 5). For example, the first set of information is shared by the first wireless device 210a with the second wireless device 402 via a first shared communication link (e.g., the shared communication link 400 of FIGS. 4 and 5) of the shared communication network and/or with the third wireless device 502 via a second shared communication link (the shared communication link 506 of FIG. 5) of the shared communication network 500. Thus, the market information sharer 1010 prevents the market information distributor 1008 from having to obtain duplicative sets of commonly requested information via the assigned communication links 202a, 404, 504. As a result, the amount of information communicated via the assigned communication links 202a, 404, 504 is substantially reduced and the available collective bandwidth resources of the trading devices 210a, 402, 502 are substantially increased.

In some examples, the shared communication links 400, 506, 508 are wireless or mobile ad hoc networks based on, for example, Bluetooth protocols. For example, the transmission rate for Bluetooth ad hoc networks is 721 kilobits per second (kbps). In some examples, the assigned communication links 202a, 404, 504 in communication with the gateway 220a are cellular or mobile networks or Wi-Fi networks that have a significantly slower transmission rate compared to a Bluetooth ad hoc network as a result of a deteriorated communication state (e.g., a low connectivity level, latency at the gateway, etc.). Thus, because the market information distributor 1008 and the market information sharer 1010 of the system 1000 reduces the amount of information communicated via the assigned communication links 202a, 404, 504, the system 1000 substantially reduces the amount of information communicated via the communication links 202a, 404, 504 having low transmission rates and, consequentially, substantially increased the amount of information communicated via the shared communication links 400, 506, 508 having high transmission rates. As a result, the system 1000 further increases the available collective bandwidth resources of the wireless devices 210a, 402, 502 in communication with each other via the shared communication links 400, 506, 508 and/or the shared communication network 500.

Figure 11:
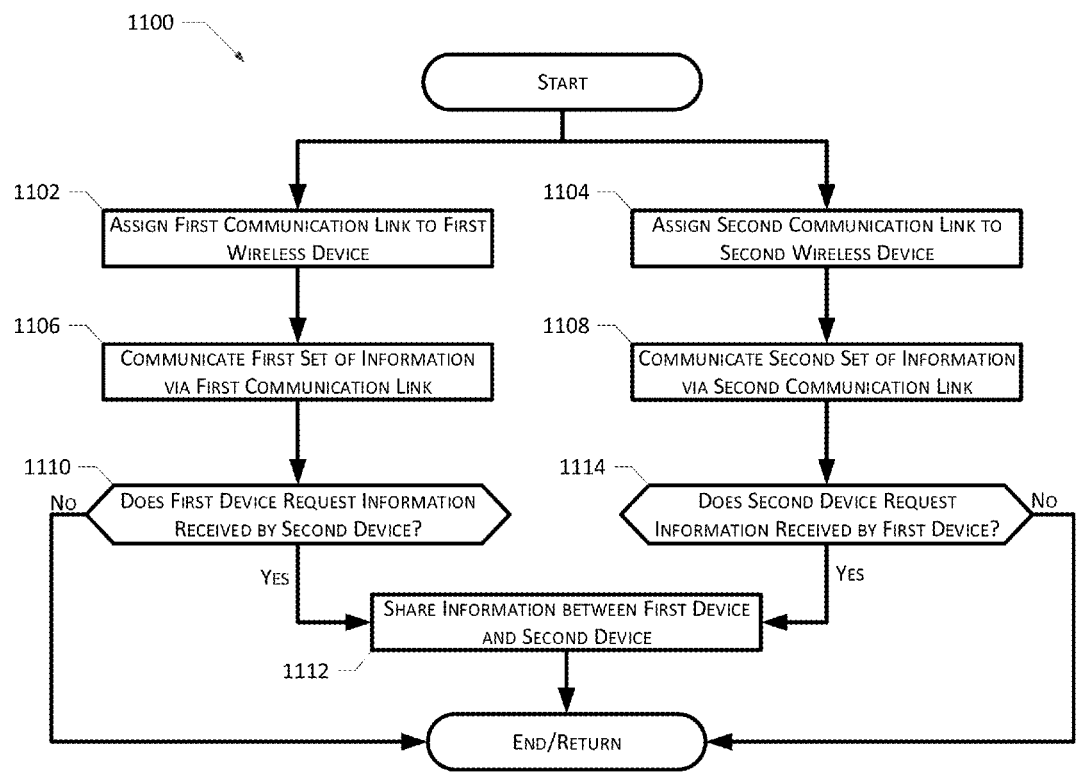
FIG. 11 illustrates an example method to share information via a shared communication link.

FIG. 11 illustrates an example method 1100 to share information (e.g., market data, orders messages, fill data) via a shared communication link in an electronic trading system. The example method 1100 may be performed by any wireless device (e.g., the trading devices 210a, 402 of FIG. 4), gateway (e.g., the gateway 220a of FIG. 4), or combination thereof. The method 1100 of FIG. 11 includes the link assigner 1004 assigning a first communication link (e.g., the network 202a of FIG. 4) between a first wireless device (e.g., the trading device 210a of FIG. 4) and a gateway (e.g., the gateway 220a of FIG. 4) (block 1102). Further, the method 1100 includes the link assigner 1004 assigning a second communication link (e.g., the network 404 of FIG. 4) between a second wireless device (e.g., the trading device 402 of FIG. 4) and the gateway (block 1104).

The example method 1100 includes the market information distributor 1008 communicating a first set of information (e.g., a first set of market information such as market data, order messages, and fill data) between the gateway 220a and the first wireless device 210a via the first communication link 202a (block 1106). Further, the market information distributor 1008 communicates a second set of information (e.g., a second set of market information) different than the first information between the gateway 220a and the second wireless device 402 via the second communication link 404 (block 1108). Information may be communicated via a single market information distributor (e.g., the market information distributor 1008) and/or a plurality of market information distributors. In some examples in which there is a plurality of market information distributors, each market information distributor is performed on a different wireless device (e.g., the trading devices 210a, 402 of FIG. 4).

In some examples, communicating the first and second sets of information via the respective first and second communication links 202a, 404 includes selecting which information is included in the first set of information and the second set of information based on a first communication state of the first communication link 202a and a second communication state of the second communication link 404. In some such examples, the market information distributor 1008 apportions which information is assigned to the first and second communication links 202a, 404 by comparing the communication state of the first communication link and the communication state of the second communication link. In some examples, if the connectivity level (e.g., 80% of the maximum level of connectivity) of the first communication link 202a is greater than the connectivity level (e.g., 60% of the maximum level of connectivity) of the second communication link 404, the market information distributor 1008 assigns a greater quantity of information to the first set of information than the second set of information. In some examples, communicating the first and second sets of information via the respective first and second communication links 202a, 404 includes assigning each set of information a unique identification number to prevent duplicative sets of information from being communicated via the first and second communication links 202a, 404. In some examples, the market information distributor 1008 determines if any information is requested by both the first wireless device 210a and the second wireless device 402 when communicating the first and second sets of information via the respective first and second communication links 202a, 404. In such examples, the market information distributor 1008 apportions the commonly requested information between the first and second communication links 202a, 404 to reduce the amount of information communicated via the first and second communication links 202a, 404.

After the first set of information is communicated via the first communication link 202a, the market information sharer 1010 identifies whether the first wireless device 210a has requested information that was obtained (e.g., received, retrieved and/or accessed) by the second wireless device 402 via the second communication link 404 (block 1110). If the first wireless device 210a has requested information that was obtained by the second wireless device 402, the market information sharer 1010 communicates the information from the second wireless device 402 to the first wireless device 210a via a shared communication link (e.g., the shared communication link 400 of FIG. 4) (block 1112). Further, the market information sharer 1010 identifies whether the second wireless device 402 has requested information that was obtained by the first wireless device 210a via the first communication link 400 (block 1114). If the second wireless device 402 has requested information that was obtained by the first wireless device 210a, the market information sharer 1010 communicates the information from the first wireless device 210a to the second wireless device 402 via the shared communication link 400 (block 1112). By sharing information via the shared communication link 400, the market information sharer 1010 reduces the amount of information communicated via the first and second communications links 202a, 404 and, thus, increases the available collective bandwidth resources of the first and second wireless devices 210a, 402. The method 1100 ends and/or returns to start after the requested information is shared between the first and second wireless devices 210a, 402 via the shared communication link 400.

Figure 12:
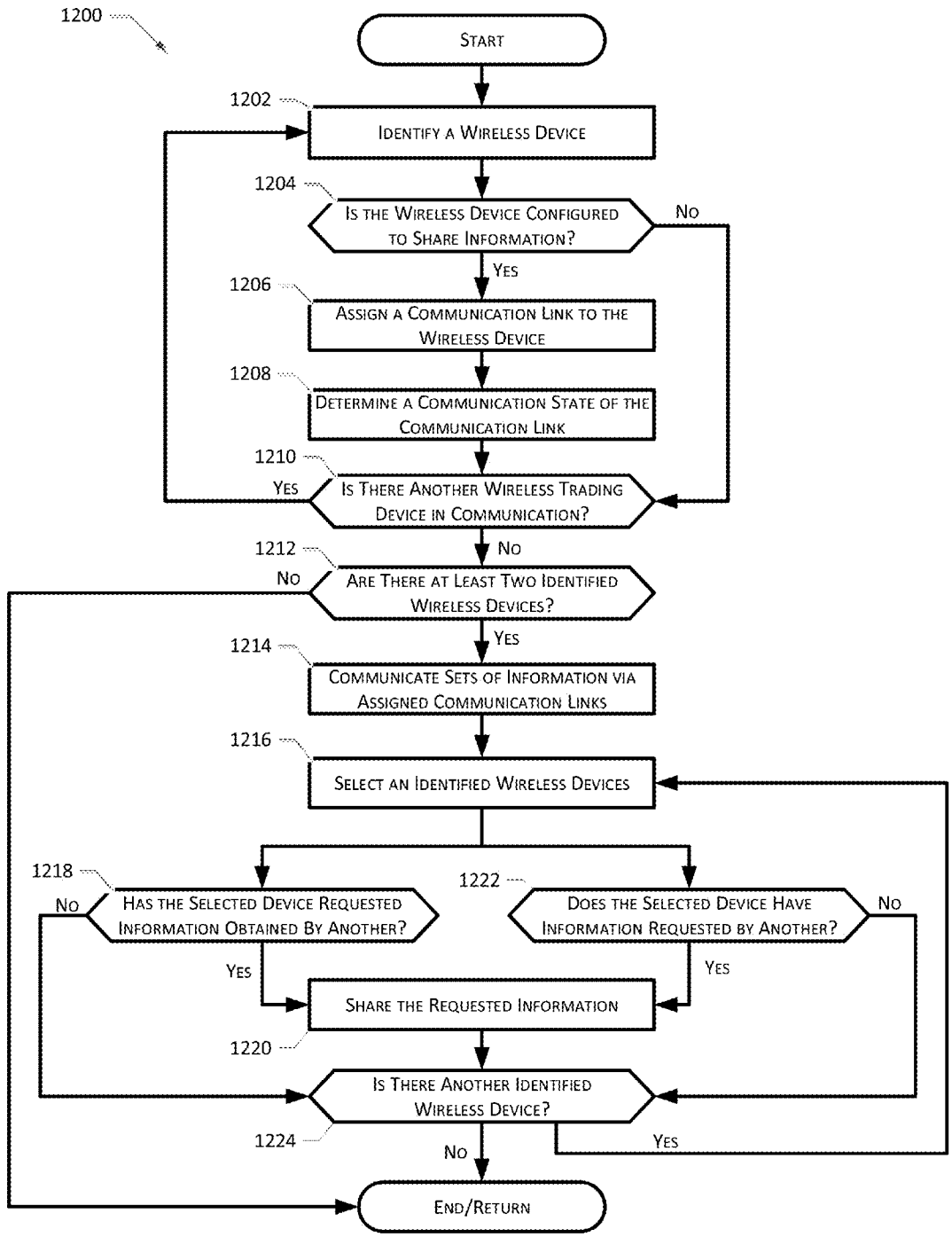
FIG. 12 illustrates another example method to share information via a shared communication network.

FIG. 12 illustrates another example method 1200 to share information via a shared communication network in an electronic trading system. The method 1200 may be performed by any wireless device (e.g., the trading devices 210a, 402, 502 of FIG. 5), gateway (e.g., the gateway 220a of FIG. 5), or combination thereof. The method 1200 of FIG. 12 includes the device identifier 1002 identifying a wireless device (e.g., the trading device 210a of FIG. 5) in communication with a gateway (e.g., the gateway 220a of FIG. 5) (block 1202). After the wireless device 210a is identified, the device identifier 1002 verifies that the wireless device 210a is configured to share information via a shared communication link (e.g., the shared communication link 400 of FIG. 5, the shared communication link 506 of FIG. 5) and/or a shared communication network (e.g., the shared communication network 500 of FIG. 5) (block 1204). For example, the wireless device 210a may be configured to communicate with all other wireless devices identified by the device identifier 1002, with only other wireless devices identified as being associated with the wireless device 210a (e.g., associated with a trading group), with only those wireless devices a user individually selects and/or with only those wireless devices that are configured to share market information with the wireless device 210a.

If the wireless device 210a is not configured to share information, the device identifier 1002 identifies whether there is another wireless device in communication with the gateway (block 1210). Otherwise, if the wireless device 210a is configured to share information, the link assigner 1004 assigns a communication link (e.g., the network 202a of FIG. 5) between the wireless device 210a and the gateway 220a (block 1206). After the communication link 202a is assigned, the state determiner 1006 determines a communication state of the communication link 202a (block 1208). For example, the state determiner 1006 determines the communication state by monitoring one or more communication conditions of the wireless device 210a, the gateway 220a and/or the communication link 202a, such as a connectivity level of the wireless device 210a with the communication link 202a, a remaining battery power of the wireless device 210a, a geographic location of the wireless device 210a, a latency of one or more servers at the gateway 220a, an amount of memory being utilized by the gateway 220a, a percent or rate of data loss via the communication link 202a, etc. In examples in which the communication state is based on the connectivity level of the communication link 202a, the connectivity level is measured relative to a maximum level of connectivity of the communication link 202a. For example, the communication state may be defined as high, medium, intermittent, low or no connectivity and/or as a percentage of the maximum level of connectivity (e.g., 75% of the maximum level of connectivity). After the communication state of the communication link 202a is determined, the device identifier 1002 identifies whether there is another wireless device in communication with the gateway (block 1210). If another wireless device (e.g., the trading device 402 of FIG. 5, the trading device 502 of FIG. 5) is in communication with the gateway 220, blocks 1202, 1204, 1206, 1208 of FIG. 12 are repeated for the other identified wireless device. Further, blocks 1202, 1204, 1206, 1208, 1210 are repeated until all devices in communication with the gateway are identified.

After the wireless devices 210a, 402, 502 in communication with the gateway 220a are identified, the method 1200 includes identifying whether there are at least two identified wireless devices that are configured to share information with other wireless devices (block 1212). If there are not at least two of such wireless devices, the method 1200 ends and/or returns to the start.

If there are two or more wireless devices that are configured to share information, the market information distributor 1008 communicates sets of information between the gateway 220*a* and the identified wireless devices 210*a*, 402, 502 via the corresponding communication links 202*a*, 404, 504 (block 1214). Communicating sets of information via the assigned communication links 202*a*, 404, 504 includes assigning each communication link 202*a*, 404, 504 to communicate a set of information between the gateway 220 and the corresponding wireless device 210*a*, 402, 502. In some examples, the market information distributor 1008 assigns the sets of information to the communication links 202*a*, 404, 504 based on the communication state of each communication link 202*a*, 404, 504. For example, the amount of information assigned to each communication link 202*a*, 404, 504 may correspond to the connectivity level of the communication link 202*a*, 404, 504, such that a communication state having a high connectivity level is assigned a larger set of information than a communication state having an intermittent or low level of connectivity. In some examples, the market information distributor 1008 assigns a unique identification number to each set of information to prevent the gateway 220*a* from providing duplicative sets of information to the identified wireless devices 210*a*, 402, 502. In some examples, to reduce the amount of information communicated from the gateway 220*a* via the communication links 202*a*, 404, 504, the market information distributor 1008 apportions information that is commonly requested by at least two of the identified wireless devices 210*a*, 402, 502 between the assigned communication links 202*a*, 404, 504. Further, communicating sets of information via the communication links 202*a*, 404, 504 includes sending, requesting, receiving, accessing, obtaining and/or retrieving each set of information from the gateway 220*a*. In some examples in which there is commonly requested information, the commonly requested information is prioritized and, thus, is communicated before the non-commonly requested information is communicated from the gateway 220*a*.

After the identified wireless devices 210*a*, 402, 502 receive the sets of information via the assigned communication links 202*a*, 404, 504, the market information sharer 1010 selects one of the identified wireless devices (e.g., the wireless device 210*a*) (block 1216). If the selected wireless device has requested information that another wireless device (e.g., the wireless device 402) has obtained (e.g., received, retrieved and/or accessed) (block 1218), the other wireless device shares the requested information with the selected wireless device via a shared communication link (e.g., the shared communication link 400 of FIG. 5) of a shared communication network (e.g., the shared communication network 500 of FIG. 5) (block 1220). Similarly, if the selected wireless device has obtained data that another wireless device (e.g., the wireless device 502) has requested and has yet to receive (block 1222), the selected wireless device shares the obtained information with the other wireless device via a shared communication link (e.g., the shared communication link 506) of the shared communication network (block 1220).

After the information is shared and/or if there is no other requested information to share, the market information sharer 1010 identifies whether there is another identified wireless device (block 1224). If there is not another identified wireless device, the method 1200 ends and/or returns to start. If there is another identified wireless device (e.g., the trading device 402), blocks 1216, 1218, 1220, 1222 of FIG. 12 are repeated for the other wireless device. Further, blocks 1216, 1218, 1220, 1222, 1224 of FIG. 12 are repeated until all identified wireless devices have been selected. Afterwards, the method 1200 ends and/or returns to start.

Figure 13:
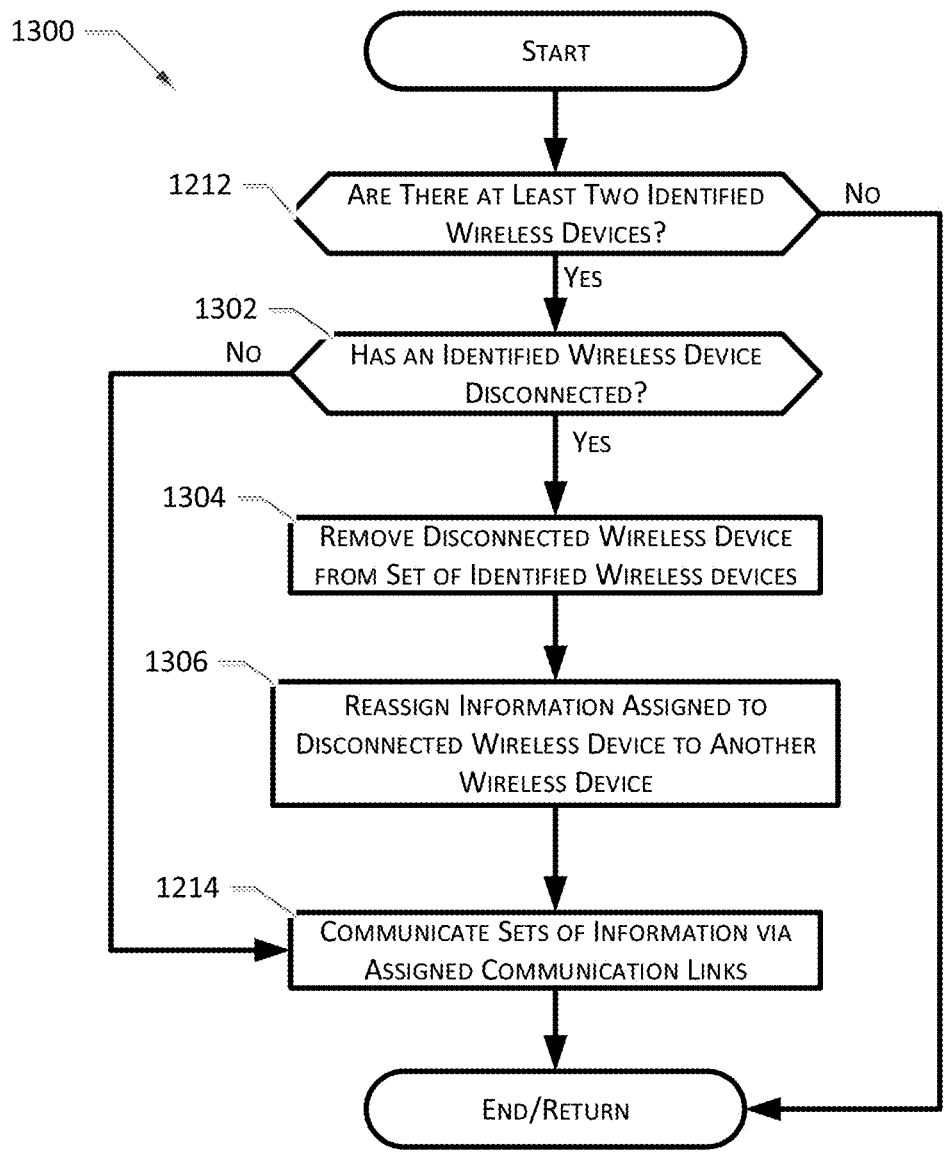
FIG. 13 illustrates a method to distribute assigned information which may be employed within the method of FIG. 12.

FIG. 13 illustrates an example method 1300 to distribute information assigned to a disconnected wireless device within the method 1200 of FIG. 12. As illustrated in FIG. 13, the method 1300 includes determining whether there are at least two identified wireless devices configured to share information with other wireless devices (block 1212). If there are not at least two of such wireless devices, the method 1200 ends and/or returns to the start. If there are two or more wireless devices that are configured to share information via the shared communication link 400 and/or the shared communication network 500, the device identifier 1002 identifies whether any of the wireless devices (e.g., the wireless device 210*a*) configured to share information has disconnected from the shared communication link 400, the shared communication network 500 and/or the gateway 220*a* (block 1302). In some examples, the wireless device 210*a* becomes disconnected from the shared communication link 400 and/or the shared communication network 500 as a result of the wireless device 210*a* lacking any battery power. In some examples, the wireless device 210*a* becomes disconnected from the shared communication link 400 and/or the shared communication network 500 as a result of the wireless device 210*a* moving away from the other identified trading devices (e.g., the wireless devices 402, 502) such that the wireless device 210*a* is outside a communicative range of the shared communication link 400 and/or the shared communication network 500. In some examples, the wireless device 210*a* disconnects from the gateway 220*a* when the communication state of the wireless device 210*a* becomes less than a threshold state.

If no identified wireless device has disconnected from the shared communication link 400 and/or the shared communication network 500, the market information distributor 1008 communicates sets of information via the assigned communication links 202*a*, 404, 504 (block 1214). If an identified wireless device (e.g., the wireless device 210*a*) has disconnected from the shared communication link 400 and/or the shared communication network 500, the device identifier 1002 removes the disconnected wireless device 210*a* from the set of identified wireless devices 210*a*, 402, 502 configured to share information via the shared communication link 400 and/or the shared communication network 500 (block 1304). Further, the example method 1300 includes the market information distributor 1008 reassigning the set of information assigned to the communication link 202*a* corresponding to the disconnected wireless device 210*a* (block 1306). In some examples, the set of information is reassigned to a communication link (e.g., the communication link 404) that remains in communication with the shared communication link 400 and/or the shared communication network 500. In some examples, the set of information is divided and distributed among a plurality of the assigned communication links (e.g., the communication links 404, 504). After the set of information associated with the disconnected wireless device 210*a* is redistributed, the market information distributor 1008 communicates the assigned sets of information from the gateway 220*a* to the remaining wireless devices 402, 502 via the corresponding communication links 404, 504 (block 1214). After the sets of information are communicated, the method 1300 ends and/or is returned to the start.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A method comprising:
    determining by a first wireless trading device a first network service state of a first communication network established between the first wireless trading device and an exchange;
    receiving by the first wireless trading device from a second wireless trading device a second network service state of a second communication network established between the second wireless trading device and the exchange, wherein the first wireless trading device receives the second network state from the second wireless trading device via a shared communication link, wherein the shared communication link is shared between the first wireless trading device and the second wireless trading device;
    determining by the first wireless trading device an active communication network based on a quality-of-service metric calculated between the first communication network and the second communication network by comparing the first network service state and the second network service state;
    communicating by the first wireless trading device market information related to one or more markets with the exchange utilizing the active communication network;
    receiving by the first wireless trading device an assignment of a first unique identification number from a gateway;
    receiving by the second wireless trading device an assignment of a second unique identification number from the gateway;
    receiving by the first wireless trading device a first set of market information associated with the first unique identification number from the gateway;
    receiving by the second wireless trading device a second set of market information associated with the second unique identification number from the gateway; and
    distributing by the first wireless trading device the market information to the second wireless trading device via the shared communication link.

2. The method of claim 1, wherein determining the first network service state comprises monitoring a plurality of communication criteria.

3. The method of claim 1, further comprising calculating the quality-of-service metric based on comparing the first network service state to a threshold state, and wherein the active communication network excludes the first communication network if the first network service state is less than the threshold state.

4. The method of claim 1, wherein communicating the market information comprises communicating at least one of market data, an order message, and fill data.

5. The method of claim 1, further comprising receiving by the first wireless trading device from a third wireless trading device a third network service state of a third communication network established between the third wireless trading device and the exchange, wherein the first wireless trading device receives the third network state from the third wireless trading device via a second shared communication link, wherein the second shared communication link is shared between the first wireless trading device and the third wireless trading device.

6. The method of claim 5, further comprising calculating by the first wireless trading device the quality-of-service metric between the first communication network, the second communication network, and the third communication state.

7. The method of claim 5, further comprising:
    distributing by the first wireless trading device the market information to the third wireless trading device via the second shared communication link.

8. The method of claim 5, wherein a third shared communication link is shared between the second wireless trading device and the third wireless trading device.

9. The method of claim 8, further comprising:
    determining by the first wireless trading device a new active communication network based on the quality-of-service metric calculated between the first communication network, the second communication network, and the third communication network, wherein the new active communication network comprises the second communication network;

communicating by the second wireless trading device market information related to one or more markets with the exchange utilizing the active communication network;

distributing by the second wireless trading device the market information to the first wireless trading device via the shared communication link; and distributing by the second wireless trading device the market information to the third wireless trading device via the third shared communication link.

10. The method of claim 1, wherein communicating the market information comprises communicating a first set of market information via the first communication network and communicating a second set of market information via the second communication network.

11. The method of claim 1, wherein the active communication network comprises both the first communication network and the second communication network.

12. The method of claim 1, further comprising:

distributing by the first wireless trading device the first set of market information to the second wireless trading device via the shared communication link; and distributing by the second wireless trading device the second set of market information to the first wireless trading device via the shared communication link, wherein the first set of market information is different than the second set of market information.

* * * * *